(12) United States Patent
Kuhn et al.

(10) Patent No.: US 12,162,636 B2
(45) Date of Patent: Dec. 10, 2024

(54) ROW-FORMING DEVICE, ROW-FORMING METHODS AND BOTTLE HANDLING INSTALLATION

(71) Applicants: AUTEFA Solutions Germany GmbH, Friedberg (DE); Rudolf Kuhn, Neusäß (DE)

(72) Inventors: Rudolf Kuhn, Neusäß (DE); Jan Schneider, Olching (DE); Lorenz Sailer, Friedberg (DE); Peter Obert, Hennhofen (DE); Peter Knobloch, Gersthofen (DE)

(73) Assignee: AUTEFA SOLUTIONS GERMANY GMBH, Friedberg (DE)

( * ) Notice: Subject to any disclaimer, the term of this patent is extended or adjusted under 35 U.S.C. 154(b) by 169 days.

(21) Appl. No.: 17/914,431

(22) PCT Filed: Mar. 24, 2021

(86) PCT No.: PCT/EP2021/057594
§ 371 (c)(1),
(2) Date: Sep. 26, 2022

(87) PCT Pub. No.: WO2021/191291
PCT Pub. Date: Sep. 30, 2021

(65) Prior Publication Data
US 2023/0123396 A1 Apr. 20, 2023

(30) Foreign Application Priority Data

Mar. 27, 2020 (DE) .................. 20 2020 101 678.4
Jun. 29, 2020 (DE) .................. 20 2020 103 718.8

(51) Int. Cl.
*B65B 21/14* (2006.01)
*B65D 71/00* (2006.01)
(Continued)

(52) U.S. Cl.
CPC .......... *B65B 21/14* (2013.01); *B65D 71/0088* (2013.01); *B65G 1/06* (2013.01);
(Continued)

(58) Field of Classification Search
CPC ...... B65G 1/06; B65G 47/082; B65G 47/256; B65G 47/53; B65G 47/82; B65G 47/91;
(Continued)

(56) References Cited

U.S. PATENT DOCUMENTS 3,104,753 A * 9/1963 Osborne .............. B65G 47/684
198/447
3,557,932 A * 1/1971 Laub, III .................. B08B 9/44
198/433
(Continued)

FOREIGN PATENT DOCUMENTS

DE 2211793 A1 9/1973
DE 68905048 T2 9/1993
(Continued)

*Primary Examiner* — James R Bidwell
(74) *Attorney, Agent, or Firm* — McGlew and Tuttle, P.C.

(57) ABSTRACT

A row-forming device (10) together with processes form a bottle row (8) from a bottle layer (7). The row-forming device (10) is configured to pick up and transport away, in rows, the respectively frontmost layer row (61) of the bottle layer (7) moved in a conveying direction (60), in a transverse transport direction (72). One or more layer conveyors (59) moves the bottle row (7) in a conveying direction (60) and adjoins the transport device (62), which has a plurality of parallel conveyor belts (63, 66) that extend in the transport direction (72) and are driven independently and also exhibit mutually different transport speeds. The transport device (62) has a guide strip (68) oriented obliquely to the transport direction (72). The guide strip (68) extends over a
(Continued)

part of the conveyor belts (63, 66) and is arranged downstream of the layer conveyor (59) in the transport direction (72).

20 Claims, 21 Drawing Sheets

(51) Int. Cl.
*B65G 1/06* (2006.01)
*B65G 15/00* (2006.01)
*B65G 47/08* (2006.01)
*B65G 47/256* (2006.01)
*B65G 47/53* (2006.01)
*B65G 47/68* (2006.01)
*B65G 47/82* (2006.01)
*B65G 47/91* (2006.01)
*B65G 47/92* (2006.01)

(52) U.S. Cl.
CPC ......... *B65G 47/082* (2013.01); *B65G 47/256* (2013.01); *B65G 47/53* (2013.01); *B65G 47/682* (2013.01); *B65G 47/82* (2013.01); *B65G 47/91* (2013.01); *B65G 47/92* (2013.01); *B65G 15/00* (2013.01); *B65G 2201/0244* (2013.01)

(58) Field of Classification Search
CPC .... B65G 47/92; B65G 47/681; B65G 47/682; B65D 1/22; B65D 19/002; B65D 71/0088; B65B 21/14

USPC ......................................................... 198/433
See application file for complete search history.

(56) References Cited

U.S. PATENT DOCUMENTS

| | | | | |
|---|---|---|---|---|
| 3,669,283 | A | * | 6/1972 | Brown, Jr. ............. B65G 59/02 |
| | | | | 414/931 |
| 4,669,604 | A | * | 6/1987 | Lenhart ............. B65G 21/2036 |
| | | | | 198/452 |
| 4,974,719 | A | * | 12/1990 | Chenevard .......... B65G 47/681 |
| | | | | 198/452 |
| 4,976,343 | A | | 12/1990 | Fuller |
| 5,267,821 | A | * | 12/1993 | Bodart .................... B42C 19/08 |
| | | | | 412/14 |

FOREIGN PATENT DOCUMENTS

| | | | | |
|---|---|---|---|---|
| DE | 29913237 | U1 | 12/2000 | |
| DE | 10230524 | A1 | 1/2004 | |
| DE | 102008026326 | A1 | 12/2009 | |
| EP | 0574750 | A1 * | 5/1993 | ............ B65G 47/30 |
| EP | 1204578 | A1 | 5/2002 | |
| EP | 1204578 | B1 | 10/2003 | |
| EP | 2052998 | A1 | 4/2009 | |
| JP | S60251020 | A | 12/1985 | |
| JP | H04115817 | U | 10/1992 | |
| JP | 2019519449 | A * | 7/2019 | ............ B65G 47/31 |
| WO | 2013005171 | A1 | 1/2013 | |

\* cited by examiner

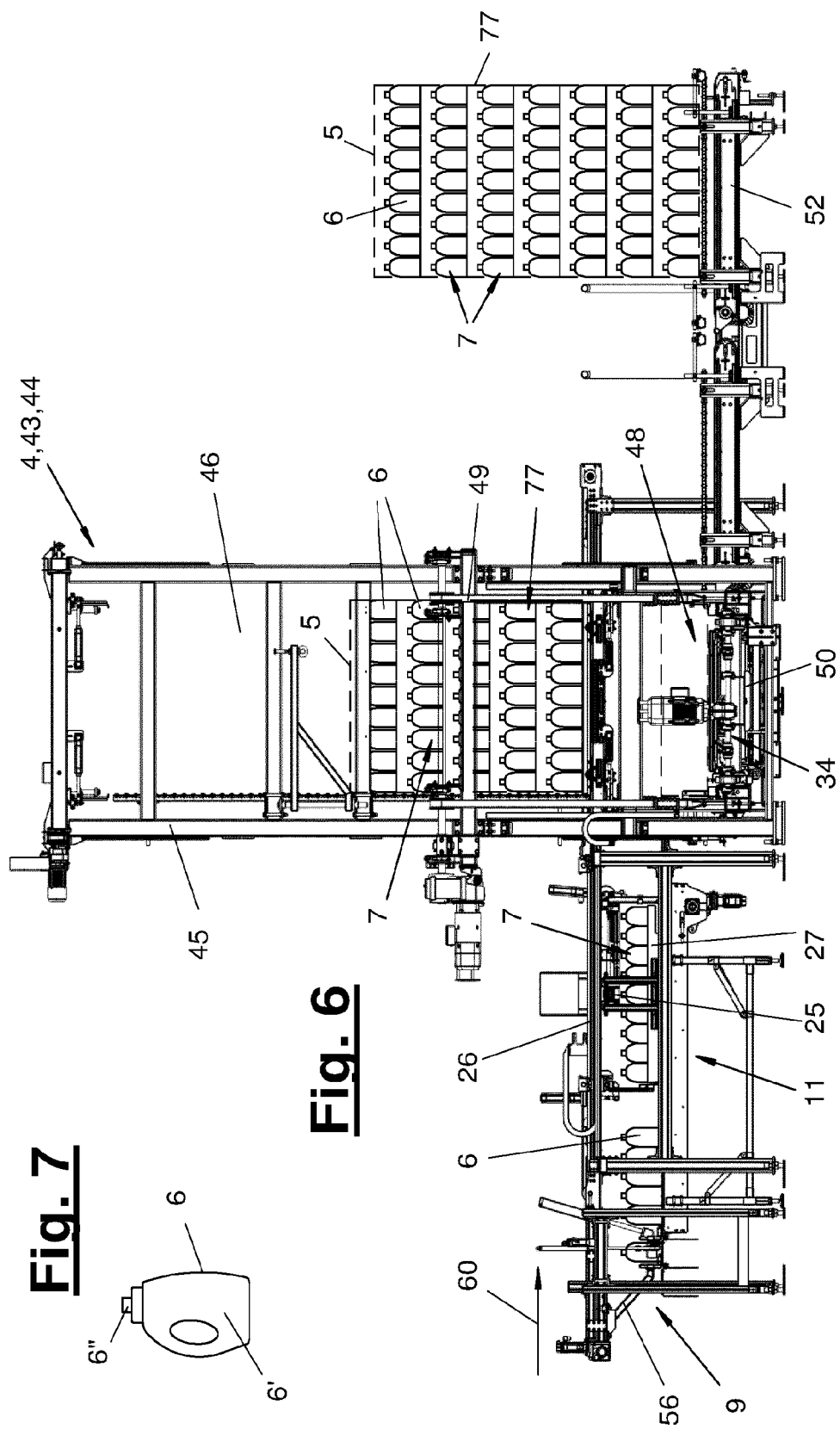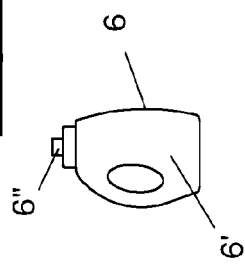

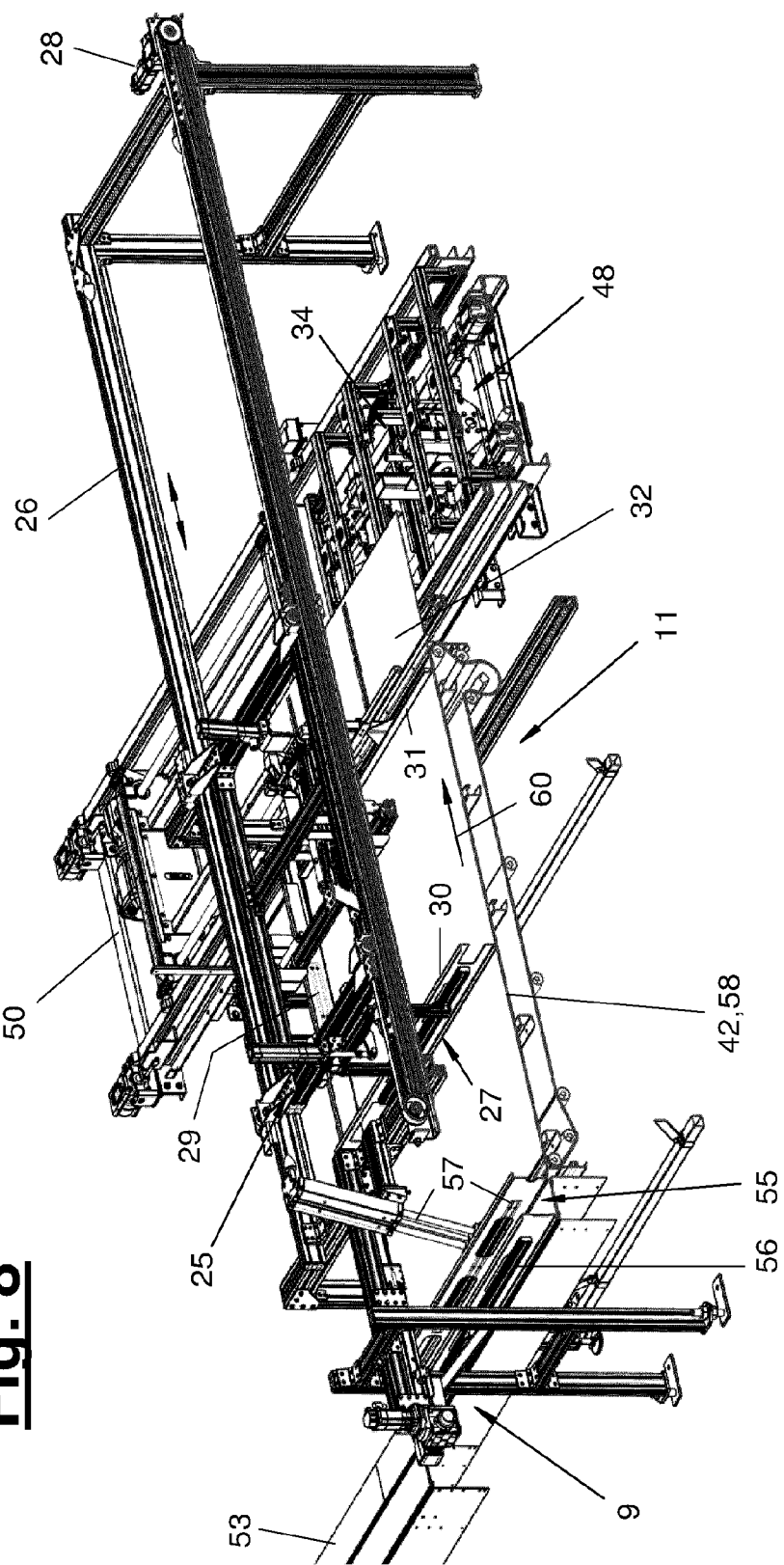

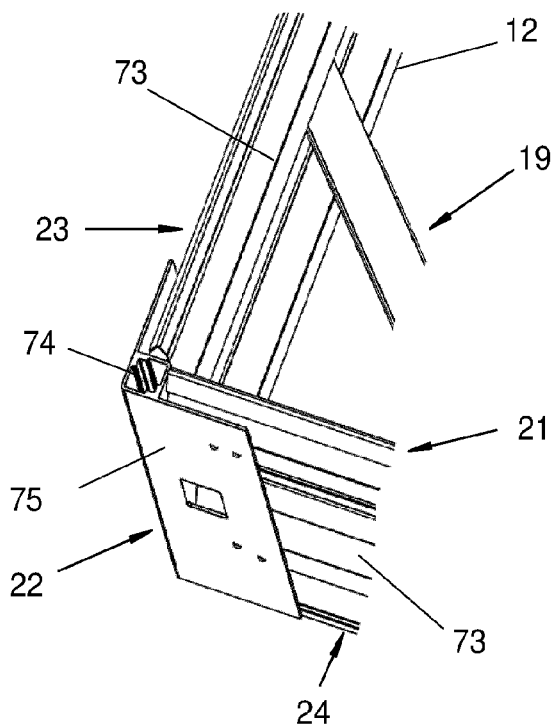
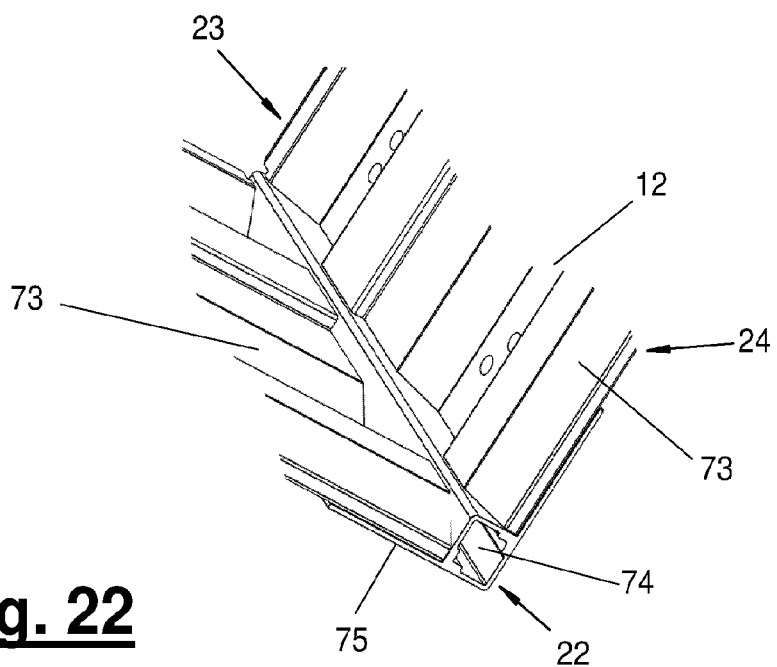

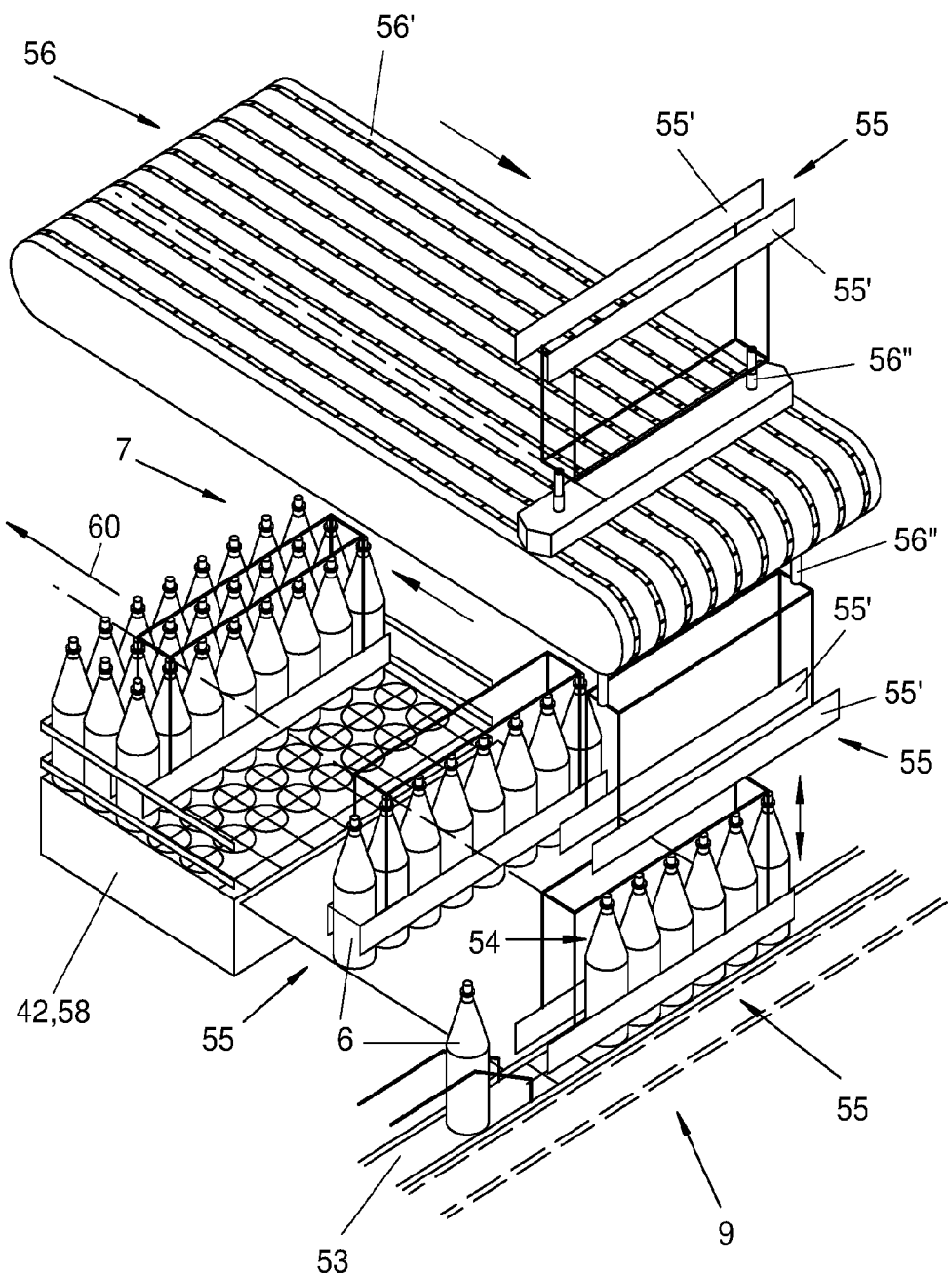

ROW-FORMING DEVICE, ROW-FORMING METHODS AND BOTTLE HANDLING INSTALLATION

CROSS REFERENCE TO RELATED APPLICATIONS

This application is a United States National Phase Application of International Application PCT/EP2021/057594, filed Mar. 24, 2021, and claims the benefit of priority under 35 U.S.C. § 119 of German Applications 20 2020 101 678.4, filed Mar. 27, 2020, and 20 2020 103 718.8, filed Jun. 29, 2020, the entire contents of which are incorporated herein by reference.

TECHNICAL FIELD

The present invention pertains to a row-forming device, to the corresponding process and to a bottle handling plant, as well as to components thereof along with related processes.

TECHNICAL BACKGROUND

A row-forming device along with processes for vessels or piece goods in metallurgical plants is known from DE 22 11 793 A1. The row-forming device has a supply station comprising a plurality of running individual apron conveyors arranged next to one another and an adjoining two-track vessel conveyor extending transversely to the individual apron conveyors.

A bottle tray and a bottle handling plant along with processes are known from EP 1 204 578 B1. The bottles being fed from a feed station are gripped in rows and are loaded into the bottle tray, wherein a bottle layer is formed in the bottle tray. The bottle tray and the bottle layer are stored intermediately together in a buffer storage device for the further handling, especially for filling empty bottles. When needed, the bottles are removed, and the bottles are unloaded in rows from the bottle layer and are fed to a handling station, e.g., to a filling station. The loading and unloading of the bottle tray is carried out by means of gripping devices, which grip the bottles at the neck and transfer them by a lifting-over operation. The bottle trays have an upright and rectangular peripheral side wall with an upper tray opening and with a tray bottom permanently connected to the side wall.

SUMMARY

An object of the present invention is to provide improved bottle handling technology.

The present invention accomplishes this object with the features described according to the invention.

The bottle handling technology of the invention, i.e., the row-forming device as well as the corresponding process and the handling plant as well as components thereof along with corresponding processes have various advantages.

The bottle handling technology being claimed is suitable for all types of bottles. This applies especially to bottles that have bottle necks that cannot be gripped from the top or can be gripped from the top with difficulty only. These may be bottles with an eccentric or poorly accessible arrangement of the bottle neck, with a non-rotationally symmetrical or non-centrosymmetric cross-sectional contour, with a short or non-grippable bottle neck or with other properties. Such bottles cannot be gripped with the grippers according to the above-mentioned state of the art or they cannot be gripped with a sufficient reliability according to the above-mentioned state of the art. The bottle handling technology being claimed may also deal with problematic cross-sectional shapes of bottles, which have, e.g., a plurality of arches having different curvatures and which can be oriented and especially lined up in a row in a defined manner with difficulty only.

Bottles are defined as all types of hollow and preferably closable containers. Such bottles may have a problematic positional stability due to a small base and a relatively great bottle height. They may easily fall over especially in the empty state and cause disturbances. Empty or filled bottles can be handled with the bottle handling technology being claimed.

The bottles are picked up in a bottle layer in a bottle tray. The bottle layer is a group of a plurality of bottles, which are arranged in the bottle layer in a defined layer structure, especially in a matrix. The bottle layer may consist of a plurality of rows and columns of bottles preferably having an identical orientation and arrangement. The arrangement of the bottles in a regular matrix in the bottle layer is favorable. It is, however, also possible to arrange bottle rows with an axial offset next to one another, so that the bottles in adjacent rows are mutually offset or have a gap between them. The bottles preferably have a multilateral contact with all adjacent bottles in the bottle layer.

The row-forming device being claimed and the corresponding process are used to separate a bottle layer and to form a bottle row, especially an individual bottle row. The row-forming device and the corresponding process are especially suitable for a bottle tray with a lifting bottom and for an adapted loading device. However, they may also be used in case of other conventional bottle handling plants and bottle trays, in which, e.g., the bottle layer formed is gripped with grippers and is removed from a bottle tray having, e.g., rigid bottom. The loading device may also be configured for this purpose as a gripping and transferring device. The bottle tray may have any desired configuration. A bottle tray with lifting bottom may be configured in the preferred manner described below or in another manner.

The row-forming device has the configuration and function to pick up and remove the respective frontmost layer row of bottles of the bottle layer being moved in a conveying direction. This happens in a transport direction that is oriented transversely to the conveying direction of the bottle layer. The row-forming device may have a transport device with a plurality of parallel conveyor belts, which extend in the transport direction. Three, four, five or more conveyor belts are preferably arranged parallel next to one another. The row-forming device may have one or more layer conveyors for the motion of the bottle layer in the conveying direction.

A layer conveyor is preferably formed by an endless, running conveyor belt. This conveyor belt picks up at least one bottle layer and may have a corresponding belt width. The layer conveyor may be configured, as an alternative, in a different manner, e.g., as a layer pusher. This may be arranged, e.g., at a table with the bottle layer arranged thereon or also at a conveyor belt. The conveyor belts preferably run faster than the layer conveyor, e.g., the conveyor belt or the layer pusher.

The layer conveyor or the layer conveyors may have a controllable speed, which may be variable if necessary. The layer conveyor or the layer conveyors may be moved intermittently or in a timed manner or continuously in the conveying direction. The conveying speed may possibly be varied in case of a continuous conveying motion.

The speed may be varied in different manners. This is favorable, on the one hand, in order to reduce the distances between layers in the conveying direction in case of an arrangement of a plurality of bottle layers. On the other hand, the layer conveyor adjoining said transport device may periodically have short, e.g., pulsating phases of acceleration. After removal of the frontmost bottle row by the transport device, the remaining bottle layer and especially the bottle row following next can be accelerated for a short time and moved up as well as positioned at the boundary of the transport device. The conveying speed can then be reduced again for the removal of the positioned bottle row.

The conveyor belts of the transport device may be driven independently. They may be moved and driven continuously or intermittently. The conveyor belts may have mutually different transport speeds. There may be a gradient in this case, which increases when viewed in the conveying direction of the bottle layer. The conveyor belt located closest to the layer conveyor has the lowest transport speed, and the conveyor belt located farthest from the layer conveyor has the highest transport speed. The speed level may increase continuously between conveyor belts. As an alternative, a pulsating gradient with increasing tendency is possible, in which case the transport speed of a conveyor belt following in the conveying direction of the bottle layer is also once lower and the transport speed of the conveyor belt following next is then again markedly higher.

The conveyor belts may also have all the same transport speed. This may apply to all conveyor belts or to some of the conveyor belts. An equal transport speed may be used, e.g., in case of uncritical, especially rectangular bottle shapes. Different transport speeds are especially advantageous for oval or irregular bottle shapes.

The conveyor belt located farthest away from the layer conveyor may adjoin a following row conveyor for the bottles. The individual bottle row formed in the row-forming device is removed by said conveyor belt and the row conveyor.

The transport device may have a guide strip for the bottles, which is oriented obliquely to the transport direction of the conveyor belts and extends over a part of the conveyor belts. The guide strip may be arranged behind the layer conveyor in the transport direction and may extend to the possibly fastest conveyor belt, which is the outermost conveyor belt when viewed in the conveying direction. The oblique guide strip cooperates with the conveyor belts having different speeds and ensures a reliable contact and guiding of the bottles removed from the bottle layer at and along the guide strip. The increasing speed gradient of the conveyor belts brings about a reliable and oblique bottle feed along the guide strip. The bottles assume now a defined position and orientation at the guide strip.

The conveyor belt that is the first conveyor belt when viewed in the conveying direction may have a greater width than the other conveyor belts. The width of the first conveyor belt may be adapted to the width of the layer row or to the bottles thereof.

In addition, a guiding device, which is oriented along the transport direction and is arranged at the rear edge of the first conveyor belt when viewed in the conveying direction, is favorable. The guiding device may have a strip- or plate-shaped configuration and may extend in a straight line. It can prevent a tilting over of the bottles when the layer row of bottles is pushed over from the layer conveyor to the transport device. The guiding device may be adjustable, especially removable.

The guiding device may be used, e.g., during an intermittent or timed motion of the layer conveyor and possibly of the transport device. The layer conveyor pushes the frontmost bottle layer in a timed manner onto the, for example, stationary first conveyor belt and into contact with the guiding device, wherein the conveyor belt will then remove the bottle row and the cycle will begin anew.

For example, the guiding device may be removed in case of a continuous conveying motion of the layer conveyor with constant or periodically pulsating conveying speed and continuous transport motion of the transport device.

Nevertheless, if a bottle happens to fall over in the bottle layer or falls over on the layer conveyor or on the transport device on its way to the row conveyor, it can be removed at an outlet. This may be located at an edge guide, which defines the row conveyor and possibly the transport device on the side located opposite the layer conveyor. The edge guide can guide the bottle row having arrived on the row conveyor and possibly on the outermost conveyor belt n the transport direction.

The row-forming device may have a removing device for the fallen-over or otherwise abnormal bottles. This may have a sensor for detecting a fallen-over or abnormal bottle and an ejector, e.g., a blowing device. The ejector is actuated correspondingly to the result of the detection and it removes the bottle through the outlet.

The row-forming device may further have a turning device, which turns bottles with an incorrect orientation, e.g., incorrect orientation of the bottle neck, preferably by 180°. This may happen in the moving bottle row on the row conveyor. The turning device may have a sensor for detecting the incorrect orientation and a turning unit, e.g., a rotary gripper. The correction of incorrect orientations is especially advantageous, e.g., for a filling plant, especially in case of bottles with an eccentric arrangement of the bottle neck or of the bottle opening.

The present invention also pertains to a bottle handling plant and to a handling process, which comprises at least the row-forming device along with corresponding processes. The bottle handling plant and the handling process may comprise one or more of the additional components bottle tray, loading device, layer-forming device and storage station along with corresponding processes. The bottle handling station may contain a feed station, which is configured, e.g., as a bottle producer, especially as a blowing machine. As an alternative, a packing device is possible, which unpacks the bottle containers delivered from the outside. A handling station of the plant may comprise, e.g., a filling device for the bottles, a palletizing device or the like.

The preferred bottle tray with the loosely inserted, mobile lifting bottom and with the permanently connected tray bottom with passage openings located there, which preferably comprise a plurality of such passage openings, for a lifting device has an independent inventive significance. It has the advantage that the loading and unloading of the bottle tray can be carried out by pushing over or pushing off a bottle layer onto the lifting bottom located in a position favorable for the pushing at the upper tray opening. The bottle layer may have been formed externally before and then pushed over in the completed form onto the lifting bottom. As an alternative, a layer formation on the lifting bottom is possible as well.

Another bottle tray with lifting bottom may have a different configuration with a tray bottom and with only one central passage opening, wherein the tray bottom is formed, e.g., by edge flanges projecting on the inner side at a side wall of the bottle tray.

The bottle layer is smaller in terms of its length and width than the interior of the bottle tray, which interior receives the bottle layer. The bottle layer and the lifting bottom may have an essentially identical base size. The bottle layer may advantageously have an identical base size or a smaller base size than the lifting bottom. However, its base size may also be somewhat larger within the framework of the stability of the bottles than in the case of the lifting bottom. This can reduce the lateral distance of the bottle from the side wall of the bottle tray, which is favorable for the guiding function of the bottle tray. At the same time, the lifting bottom may acquire a sufficient clearance of motion.

The pushing over and pushing off of the bottles and of the bottle layer offers a high level of operational reliability concerning the positional stability of the bottles. A pushing operation is also favorable for maintaining the intended orientation of the bottles, especially of bottles with an irregular or arched, e.g., also asymmetric cross-sectional shape. The bottle layer can be held and possibly clamped together on a plurality of sides and preferably on all sides during the pushing over and pushing off.

The lifting bottom may lie on the tray bottom in the loaded state of the bottle tray and the bottle layer can be accommodated in a protected manner within the side wall of the bottle tray. The tray configuration being claimed is favorable for a lifting device, with which a relative lifting is generated between the side wall and the lifting bottom. Raising and lowering of the lifting bottom relative to the stationary and positioned side wall is advantageous. As an alternative, the side wall can also be moved up and down relative to the stationary lifting bottom. In a further variant, both the side wall and the lifting bottom can be moved during the relative motion. The passage openings, which are preferably present as a plurality of passage openings, are advantageous for the lifting device and they make possible the passage through them and contact with the mobile lifting bottom.

In the preferred embodiment, the tray bottom may have a plurality of struts fastened to the side wall with passage openings located between them, which make possible the passage of the lifting device and the contact with the lifting bottom. The tray bottom, especially the struts, can ensure a high dimensional stability of the bottle tray. The struts connect the opposite side walls of the bottle tray and are advantageous for the dimensional stability of the tray bottom. This is favorable for the secure loading and unloading of the bottle tray and for the trouble-free relative motion between the lifting bottom and the side wall.

The tray bottom with the one or more passage openings may advantageously be arranged in the central area of the height of the side wall. It may also be fastened to the side wall, especially to an indentation of the side wall. The lifting bottom lying over it is then likewise located in this height area. The lifting path of the relative motion between the lifting bottom and the side wall can be reduced hereby. This arrangement of the bottom is also advantageous for stacking up the bottle trays one on top of another in a tray stack. The bottles can be enclosed in the tray stack securely and enclosed on all sides.

Due to the approximately central arrangement of the tray bottom, the bottles can protrude upwards through the upper tray opening and are covered and enclosed in a cap-like manner in the stack by the lower area of the next higher bottle tray. Furthermore, an indentation of the side wall has advantages for the lateral guiding of the bottles and of the bottle layer in the bottle tray. This indentation is also advantageous for centering the tray and for a centering meshing of stacked-up bottle trays. The centering of the tray secures the tray stack. It can be laterally distanced from the bottles in a trouble-free manner. The indentation ensures, in addition, a higher mechanical stability of the side wall.

A centering of the bottom between the lifting bottom and the bottle tray, especially the tray bottom, is especially favorable. This bottom centering may be brought about, e.g., by means of obliquely arranged centering devices in corner areas of the tray bottom and lifting bottom or in another manner. The centering devices are arranged, e.g., on the underside of the lifting bottom, on the one hand, and at or in the tray bottom, on the other hand. They mesh with one another during the vertical relative motion of the lifting bottom and the side wall in a positive-locking manner. The centering devices may have complementarily beveled side walls, which act in a guiding manner during the vertical relative motion at their contact points.

The bottom centering defines the position of the lifting bottom in the bottle tray and prevents unfavorable and interfering motions of the lifting bottom during the transportation. It improves the resistance to interference and the operational reliability of the loading and unloading operations. In particular, the position of the bottle layer in the bottle tray as well as for the pushing over and pushing off is defined better and more precisely.

The bottle tray may further have a position centering unit for the bottle layer. For example, centering strips, which are extendable inwardly from the side wall and which can preferably be actuated remotely, or other centering devices, e.g., inflatable tubes, may be present for this purpose on the inner side of the side wall.

The preferred loading device and the corresponding process are used to load and unload a bottle tray with a bottle layer. The loading device and the loading process have an independent inventive significance. They are especially suitable for the above-mentioned preferred bottle tray, but they may be used for other bottle trays as well. There generally is a suitability for a bottle tray that has an upright, preferably rectangular peripheral side wall, an upper tray opening and a preferably loosely inserted, mobile lifting bottom as well as a bottom-side passage opening. Such a bottle tray may also do without a tray bottom provided permanently with the side wall. The side wall may form in this case a circumferential frame and may also have a single, large tray or passage opening on the underside.

The loading device being claimed has a layer pusher for the monoaxial or multiaxial pushing of a bottle layer and a lifting device for a relative lifting motion between the side wall and the mobile lifting bottom. The layer pusher and the lifting device are controlled such that the layer pusher pushes off a bottle layer onto the lifting bottom or pushes it off from the lifting bottom when the lifting device has brought the lifting bottom in the bottle tray into a position favorable for pushing at the upper tray opening. The top side of the lifting bottom can close now flush with the upper edge of the side wall or be arranged above this. The bottle layer can be pushed into the layer pusher standing ready during the unloading and during the relative lifting motion between the side wall and the mobile lifting bottom. The bottle layer is always guided and held hereby peripherally during the relative lifting motion. The bottles cannot fall over. The lifting device is arranged at a loading location, at which the loading and unloading of the loading tray takes place.

The loading device may have an adjoining loading table. It may also comprise an additional distribution table, onto which, e.g., the bottle layer can be pushed over with a motion of a layer pusher along a second axis. A plurality of bottle layers of the loading device can be fed parallel to or removed from the loading device via the distribution table. A bottle conveyor, e.g., a belt type conveyor, a hopper or the like may also be present instead of such a table.

The loading device may have a positioning device for the bottle tray at the lifting device. It may further have a layer conveyor arranged upstream or downstream of the lifting device for a bottle layer. Such a layer conveyor may cooperate with a possibly connected row-forming or layer-forming device for the bottles. The loading device and said devices may have a common layer conveyor. A layer conveyor may be configured, e.g., as an endlessly running conveyor belt.

The lifting device may have a lifting unit, which can be gripped through the one or more passage openings and which acts on the underside of the lifting bottom. Depending on the type of the relative motion, the lifting unit may be stationary or vertically mobile. An arrangement of a plurality of switchable and adhesive holding elements at the lifting unit, e.g., suction units or electromagnets, which act on the lifting bottom, especially on the underside thereof, is especially advantageous. The holding elements can secure the lifting bottom during the pushing over or pushing off of a bottle layer. On the other hand, they do not compromise the relative lifting motion between the lifting bottom and the bottle tray, especially the side wall. It is, in addition, favorable that the mobile lifting bottom does not wobble during this relative motion of the mobile lifting bottoms and the bottle layer stands securely. A two-dimensional distribution of the holding elements is advantageous for the secure holding effect. All forces and torques possibly acting from the outside can be absorbed hereby.

The lifting unit may have one or more strap-like lifting carriers, which are adapted to the passage opening(s) as well as pass through here, and which carry one or more holding elements each. A strap-like carrier shape is favorable for the exact positioning of the holding elements in the desired position, especially in the same plane. A strap-like carrier also offers a higher mechanical stability and more possibilities of arrangement for holding elements than does a simple lifting column. The lifting carriers may be connected to one another to form a holding frame. They may be arranged stationarily together or be raised or lowered by means of a suitable drive. This is likewise advantageous for the exact and secure holding of the lifting bottom and of the bottle layer.

The layer pusher may have a pusher frame, which can enclose the bottle layer laterally. The pusher frame may have a plurality of mobile frame parts, which can be fed laterally to the bottle layer. The pusher frame may have especially a shape that is rectangular in the top view. The bottle layer can be gripped laterally securely and be held in a clamped closed manner with the frame parts. The bottles can be pushed now tightly together in the bottle layer. The pusher frame can perform the desired pushing motion with the bottle layer by means of a guide with one or more, preferably linear guide axes and by means of a drive.

The pusher frame may, in addition, be configured for pushing in a bottle layer being conveyed. A frame part arranged on the front side may additionally have for this purpose a raisable and lowerable configuration. The lateral frame parts may form here a lateral guide for the bottle layer being conveyed. This is favorable because the bottle layer may be guided and conveyed laterally during its formation from a plurality of layer rows of bottles lined up one after another.

The preferred layer forming device and the corresponding process are used to form a bottle layer from a plurality of bottles fed individually or preferably in rows. The layer-forming device and the process may be a part of the loading technology. They have, on the other hand, independent inventive significance. They are especially suitable for the above-mentioned bottle tray with lifting bottom and for the loading device. However, they may also be employed in conventional bottle handling plants, in which, e.g., the bottle layer formed is subsequently gripped with grippers and transferred into a bottle tray with, e.g., a rigid bottom. The loading device may also be configured to this end as a gripping and transferring device.

The layer-forming device being claimed has a bottle conveyor, a row guide and a row pusher, wherein a discrete layer row is formed with the bottle conveyor, and this layer row is then pushed off transversely to its extension by the row pusher. The so-called layer row is a row of bottles. Said bottle layer is formed from a plurality of layer rows. The row pusher can push the layer row to be pushed off onto the bottle layer being in the process of being formed and push said layer row onto the last layer row of said bottle layer and preferably bring it into contact therewith.

The layer-forming device may have a layer conveyor moved in a timed manner, on which the bottle layer is formed. The row pusher pushes the layer rows one after another onto the layer conveyor and forms thereby the bottle layer. The layer conveyor can move further simultaneously or subsequently by the width of one layer row in the conveying direction during the pushing on. A cooperation with the loading device being claimed and with the layer gripper of said loading device as well as the lateral guiding thereof by frame parts are favorable in this connection.

The layer-forming device may have a row guide for the layer row of bottles at the bottle conveyor. The row pusher may have an individual pusher strip and be configured as a part of the row guide. The row guide may further have a raisable and lowerable guide element, which allows the layer row being pushed to pass in the raised position of the row pusher. The row guide and the pusher strip of the row pusher may have a strip- or plate-shaped configuration with straight extension.

In another embodiment, the row pusher may have an endless conveyor with one or preferably more lifting carriers located at spaced locations from one another in the running direction, at which lifting carriers a respective row guide each with parallel guide elements is arranged in a raisable and lowerable manner.

The preferred storage station and the corresponding process are used to store a plurality of empty and/or loaded bottle trays. It is especially suitable for the bottle trays with lifting bottom and the above-mentioned loading device as well as for the row-forming device being claimed and also for the preferred layer-forming device. The storage station can also be used, as an alternative, with said other bottle trays, loading devices and row-forming and layer-forming devices.

The storage station being claimed and the storage function may be used in different manners. They have, for example, advantages for the intermediate storage of empty bottles between a feed station, e.g., a blowing machine, and a handling station, e.g., a filling plant. As a result, differences in performance between the feed station and the handling station can be compensated and possible disturbances in the flow of conveying can be buffered.

The storage station comprises one or more tray storage units preferably with an integrated loading area for loading and/or unloading the bottle trays. When a plurality of tray storage units are present, each of them may have an integrated loading area, at which either a loading or an unloading of a bottle tray can take place. When the storage station has an individual tray storage unit with a loading location, both loading and unloading of the bottle trays can take place here. The unloaded and loaded bottle trays may remain in the storage station due to the integrated loading location and circulate here. They do not have to leave the storage station. In another embodiment, the loading area may be arranged separately from the one or more tray storage units and be connected via a conveyor to the tray storage unit or tray storage units.

The storage station may further comprise a tray stack storage unit, in which a plurality of loaded and/or empty tray stacks can be stored as needed. The tray stack storage unit may be connected to one or more tray storage units. Stacking up and/or unstacking of bottle trays may be carried out in a tray storage unit. Formed tray stacks may be stored in the tray stack storage unit and moved with stack transporters as needed. Tray stacks can be conveyed with one or more tray conveyors between the tray storage unit or tray storage units and possibly the tray stack storage unit.

A loading device of the preferred configuration or of said other configuration mentioned may be arranged at the tray storage unit. The loading device may have a mobile layer pusher for pushing a bottle layer and a lifting device for a relative lifting motion between a side wall and a mobile lifting bottom of the bottle tray. The lifting device may be arranged here at said loading area of a tray storage unit.

The tray storage unit, which is present as a single tray storage unit or as a plurality of tray storage units, may have at least one storage area for receiving a plurality of bottle trays and a storage conveyor for bottle trays. The storage conveyor can connect the respective storage area to the loading area and to the lifting device.

The storage area or the storage areas may have any desired and suitable configuration, e.g., as a stack storage unit, as a shelf storage unit or in another manner. A plurality of storage areas are preferably present, empty bottle trays being located in one storage area and loaded bottle trays with a bottle layer being located in another storage area. The loading and removal of the bottle tray into and out of the storage area in question may be carried out by means of an adapted storage device.

A loaded bottle tray can be transported to the loading location by the storage conveyor, unloaded there and then transported, empty, farther to the other storage area. This is also possible in the reverse order during the loading of an empty tray and during the storage thereof.

The storage conveyor may have a lifting device. As a result, the bottle trays can be brought into different function levels. A tray transport along the preferably straight storage conveyor can take place in an upper level. A bottle tray can be deposited in the lowered position at the loading location onto a positioning device and be positioned for loading and/or unloading. On the other hand, transfer of the bottle tray to the storage device and conversely, takeover of the tray from the storage device can take place on lowering at a storage area.

Further advantageous embodiments of the present invention are described.

Further, the following embodiments of the respective bottle tray, loading device with loading process, layer-forming device with process and storage station with storage process, which are each independently inventive, as well as of the bottle handling plant formed by said units along with handling processes, are advantageous. The features may be used individually or in any desired combination of embodiments with one another and with the row-forming device and row-forming processes.

A bottle tray, which is independently inventive, may be configured for picking up a bottle layer. It may have an upright, preferably rectangularly extending side wall, an upper tray opening and a tray bottom permanently connected to the side wall. The bottle tray may have a preferably loosely inserted, mobile lifting bottom, which lies on the tray bottom in the loaded state of the bottle tray. The tray bottom may have one or more passage openings for a lifting device for generating a relative lift between the side wall and the lifting bottom.

The tray bottom of the bottle tray may have a perforated plate or it may have one or more struts, which are located at spaced locations from one another and enclose the passage openings, and which are fastened to the side wall.

The tray bottom of the bottle tray may be arranged in the central area of the height of the side wall.

The tray bottom of the bottle tray may adjoin and be fastened to an indentation of the side wall.

The bottle tray may have a bottom centering unit acting preferably between the tray bottom and the lifting bottom. The bottom centering unit may preferably have centering units arranged obliquely in corner areas of the tray bottom and lifting bottom. The bottom centering unit may have beveled side walls.

The bottle tray may have a tray centering unit, which is configured for a centering meshing of the bottle tray in a tray stack with another, adjoining bottle tray.

The bottle tray may have a position centering unit for the bottle layer.

A loading device for loading and unloading a bottle tray with a bottle layer, which said loading device is independently inventive, may have a mobile layer pusher configured for the monoaxial or multiaxial pushing of a bottle layer, and a lifting device, which brings about a relative lifting motion between the side wall and the mobile lifting bottom. The bottle tray may have an upright, preferably rectangularly extending side wall, an upper tray opening and a preferably loosely inserted, mobile lifting bottom as well as one or more bottom-side passage openings.

The layer pusher and the lifting device of the loading device may be controlled such that the layer pusher pushes a bottle layer onto the lifting bottom or pushes same off from the lifting bottom when the lifting device has brought the lifting bottom in the bottle tray into a position favorable for pushing at the upper tray opening.

The loading device may have a loading table adjoining the lifting device and possibly a distribution table.

The loading device may have a positioning device for positioning a bottle tray at the lifting device.

The loading device may have a layer conveyor for a bottle layer, which said layer conveyor is arranged upstream or downstream of the lifting device.

The lifting device of the loading device may have a stationary or vertically mobile lifting unit, which is capable of gripping through the passage opening(s) of a bottle tray and acts on the lifting bottom.

A plurality of switchable and adhesive holding elements, which act on the lifting bottom of a bottle tray, may be arranged in a preferably two-dimensional distribution at a lifting unit of the lifting device of the loading device. An adhesive holding element may be configured as a suction unit and/or as an electromagnet.

The lifting unit of the lifting device may have a plurality of strap-like lifting carriers adapted to the passage opening of a bottle tray. These may carry each one or more switchable and adhesive holding elements.

The layer pusher of the loading device may have a pusher frame, which is capable of laterally enclosing the bottle layer, and which has a plurality of mobile frame parts that can be fed laterally to the bottle layer.

The layer pusher of the loading device may have a guide with one or more, preferably linear guide axes as well as a drive for the pusher frame. The pusher frame may be configured for pushing in a bottle layer being conveyed.

A front-side frame part of the pusher frame, which frame part is arranged transversely to a conveying direction of the bottle layer, may have a raisable and lowerable configuration, and the lateral frame parts of the pusher frame form a lateral guide for the bottle layer being conveyed.

The layer pusher of the loading device may be made ready and widened during the unloading of a bottle tray at a loading area, and the raised bottle layer can dip into the pusher frame.

The loading device may be connected to a layer-forming device for a bottle layer and/or to a row-forming deice for forming a discrete bottle row. The loading device and the connected layer-forming device and/or row-forming device may have a common layer conveyor.

A layer-forming device for forming a bottle layer from a plurality of layer rows of bottles, especially in conjunction with an aforementioned loading device, which said layer-forming device is independently inventive, may have a bottle conveyor for a bottle row, a row guide for a bottle row and a row pusher for a bottle row. The bottle conveyor may be configured for forming and positioning a discrete layer row of the bottle layer to be formed. The row pusher can push off the layer row transversely to its extension. The row pusher can push the layer row of bottles to a last layer row of a bottle layer.

The layer-forming device may have a preferably timed layer conveyor, on which the bottle layer is formed, wherein the row pusher pushes the layer rows of the bottle layer one after another onto the layer conveyor and the layer conveyor is moving forward at the same time or subsequently by the width of a layer row each in its conveying direction.

The layer-forming device may have a row guide for the layer row at the bottle conveyor, and the row pusher has an individual pusher strip, which is configured as a part of the row guide. The row guide may have a guide element having a raisable and lowerable configuration, which allows the pusher strip of the row pusher and the layer row to pass in the raised position.

The row pusher of the layer-forming device may have an endless conveyor with one or preferably more lifting carriers located at spaced locations in the running direction, at which a respective row guide with parallel guide elements is arranged in a raisable and lowerable manner.

A storage station for storing a plurality of empty and/or loaded bottle trays, which storage station is independently inventive, may have one or more tray storage units with a preferably integrated loading area for loading and/or unloading the bottle trays. The bottle tray may be configured here for picking up a bottle layer. The bottle tray may have an upright, preferably rectangularly extending side wall, an upper tray opening and a preferably loosely inserted, mobile lifting bottom as well as one or more bottom-side passage openings.

A loading device, which has a mobile layer pusher for pushing a bottle layer and a lifting device for a relative lifting motion between a side wall and a mobile lifting bottom of the bottle tray, may be arranged at a tray storage unit of the storage station, wherein said lifting device is arranged at the loading area. The loading device may have the above-mentioned embodiment according to the present invention.

A tray storage unit of the storage station may have at least one storage area for receiving a plurality of bottle trays, especially a tray stack of a plurality of bottle trays, and a storage conveyor for bottle trays, especially tray stacks, which storage conveyor connects the respective storage area to the loading area and to the lifting device.

The storage conveyor may have a lifting unit of a loading device.

The storage station may have a plurality of separately arranged tray storage units, which are connected to one another by one or more tray conveyors.

The storage station may have a tray stack storage unit with one or more stack transporters. A stack transporter may be configured as a rail-borne shuttle or as a floor-mounted, autonomous and self-steering transport vehicle, especially AGV (automated guided vehicle) or FTF. The transport vehicles may have an energy supply of their own, e.g., a rechargeable electrical battery. They may be underway in a swarm in the tray stack storage unit. They may be controlled via a fleet manager. The stack transporter, especially the transport vehicle, may have a lifting device for picking up and depositing a tray stack at a bottom-side storage place, e.g., at a support frame located there.

A layer-forming device for forming a bottle layer from a plurality of layer rows may be arranged upstream of the storage station. The layer-forming device may have the above-mentioned embodiment according to the present invention.

A row-forming device for forming a bottle row from a bottle layer may be arranged downstream of the storage station. The row-forming device may have the above-mentioned embodiment according to the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a side view of the storage station with the loading device and with the layer-forming device according to FIG. 2;

FIG. 7 is a side view showing an embodiment of a bottle;

FIG. 8 is a cut-away perspective view of the arrangement according to FIG. 6 without the storage configuration;

FIG. 21 is a perspective view of a corner area of the bottle tray from the top;

FIG. 22 is a perspective view of a corner area of the bottle tray from the bottom;

FIG. 29 is a perspective view showing a variant of the layer-forming device from FIGS. 2, 6 and 8.

DESCRIPTION OF PREFERRED EMBODIMENTS

Figure 1:
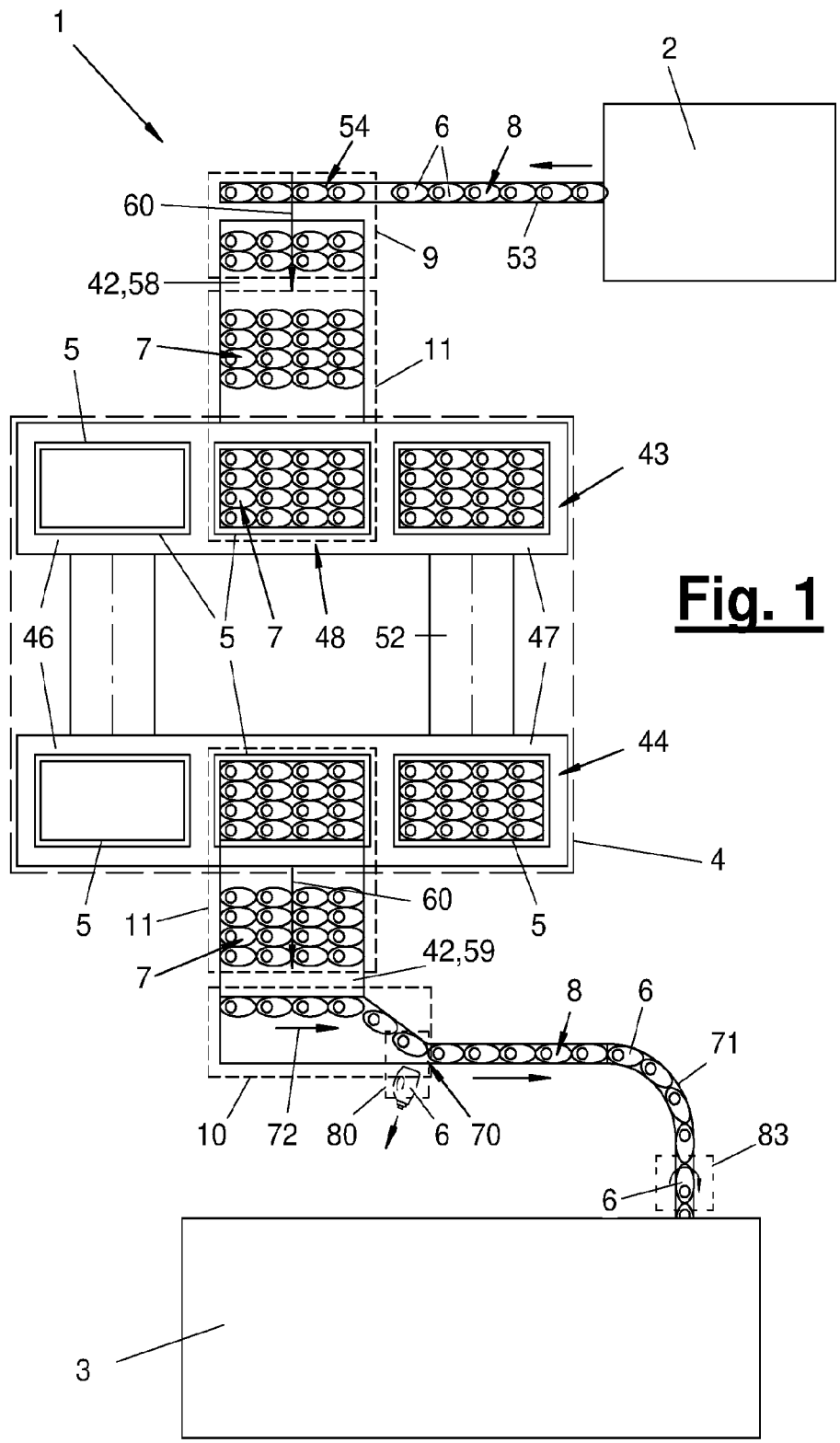
FIG. 1 is a schematic view of a bottle handling plant with a feed station, with a storage station and with a handling station as well as additional components.

Referring to the drawings, the present invention pertains to a row-forming device (10) along with processes as well as to a bottle handling plant (1) and to a handling process for bottles (6). The present invention pertains, in addition, to a bottle tray (5), to a loading device (11) along with loading processes, to a layer-forming device (9) along with processes and to a storage station (4) along with storage processes.

The above-mentioned components (4, 5, 9, 10, 11) may be present as single units or as a plurality of units. They may be used in a combination with one another in the bottle handling plant (1) and during the bottle handling process.

The above-mentioned components (4, 5, 9, 10, 11) have each independent inventive significance. They may also be used in only a partial combination with one another in a bottle handling plant (1) and in a handling process, and it is also possible to use other, conventional components, e.g., loading devices with grippers. Said components may further be used individually and optionally with other, conventional components. The bottle handling plant (1) and said components (4, 5, 9, 10, 11) may be delivered as original equipment. Said components may also be used for retrofitting or conversion in an existing bottle handling plant.

FIG. 1 shows in a schematic top view a bottle handling plant (1) with a feed station (2) of a handling station (3), with a storage station (4), with a layer-forming device (9), with a row-forming device (10) and with a loading device (11) in connection with a bottle tray (5). Furthermore, bottle conveyors are present for transporting the bottles (6) between the individual components of the plant. The feed station (2), the handling station (3), the storage station (4), the layer-forming device (9), the row-forming device (10) and the loading device (11) as well as the bottle conveyor are each equipped with a control, which controls the functions of the respective station or device. The bottle handling plant (1) may have a higher-level plant control or process control.

The feed station (2) has, e.g., a blowing machine for plastic bottles, especially PET bottles or HDPE bottles, and/or an unpacking device for bottle containers. The handling station (3) has, e.g., a filling device and/or a palletizing device for empty or filled bottles (6). In addition, other embodiments of the stations (2, 3) are possible.

Figure 25:
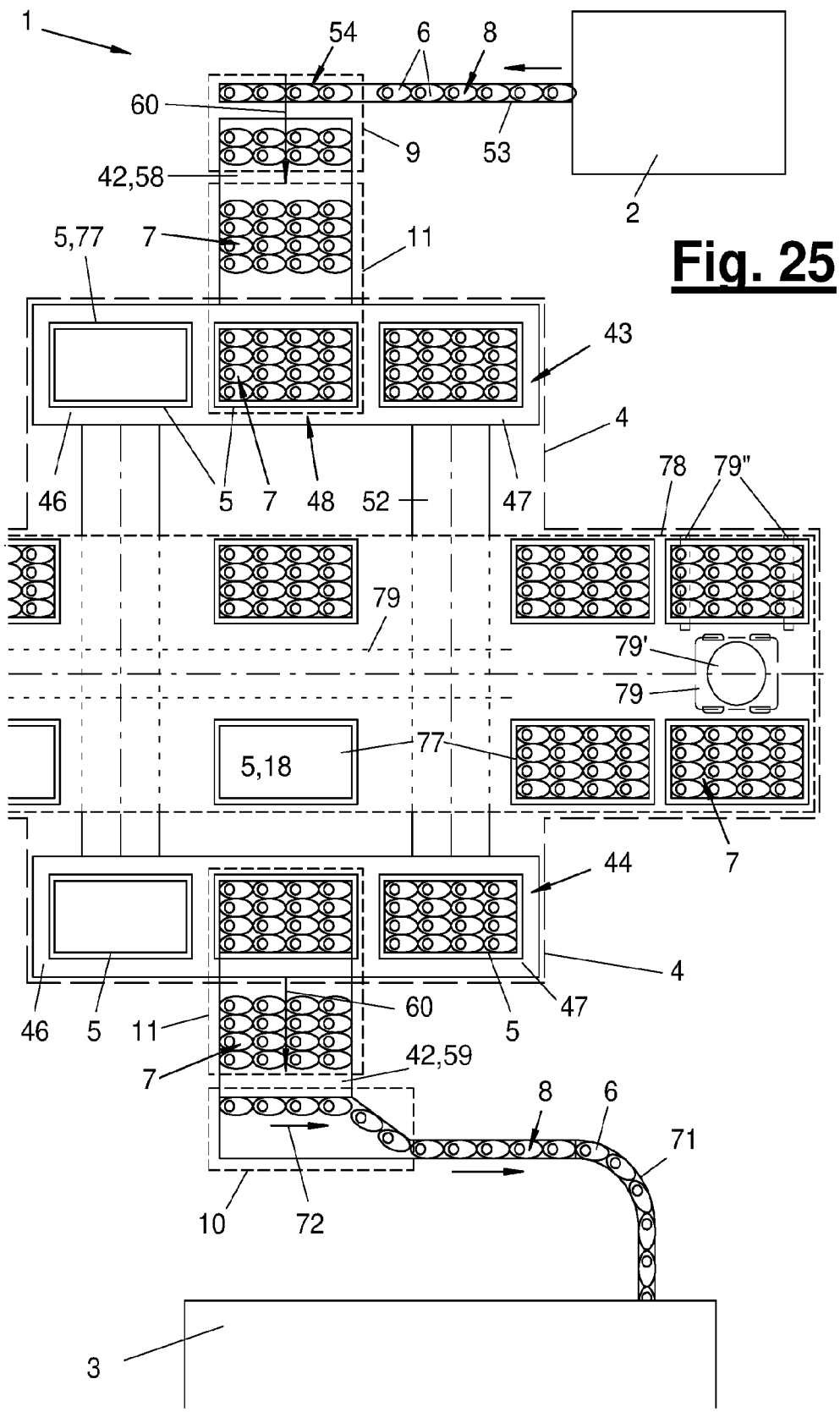
FIG. 25 is a variant of the storage station.

The storage station (4) is used for the intermediate storage of empty and/or filled bottles (6) in bottle trays (5) as needed. In addition, empty bottle trays (5) without bottles (6) can be stored. FIGS. 1 and 25 show in this connection two variants as examples.

The storage station (4) shows, e.g., two tray storage units (43, 44), which are connected to one another and possibly to a tray stack storage unit (78) by one or more tray conveyors (52). The tray conveyors (52) can convey bottle trays (5) one by one or in a tray stack (77). They make possible a change of loaded and unloaded bottle trays (5) between the tray storage units (43, 44) and possibly the tray stack storage unit (78) as well as a circulation of trays. As an alternative, the storage station (4) may have an individual tray storage unit (43, 44) or more than two tray storage units (43, 44).

FIG. 25 shows a storage station (4) with a tray stack storage unit (78). This is arranged, e.g., between two tray storage units (43, 44) located at spaced locations from one another and can be connected to these via one or more tray conveyors (52). The tray stack storage unit (78) may have a plurality of, e.g., bottom-side storage places, especially aisles, for depositing tray stacks (77) and one or more, preferably automated stack transporters (79) for conveying the tray stacks (77) from and to the storage places. The tray stacks (77) may also be deposited and stored on the stack transporter(s) (79).

The stack transporters (79) can be connected or are connected to the tray conveyor or tray conveyors (52) and can take over and release tray stacks (77) there. The stack transporters (79), which are preferably present as a plurality of stack transporters, may be arranged next to one another in the form of a row or also interlinked with one another in a grid-like manner. They may be configured, e.g., as rail-borne shuttles, as floor-mounted transport vehicles or in another manner.

Such a transport vehicle may be a driverless autonomic transport vehicle, especially AGV or FTF. It may follow its path independently and be self-steering and have a safety technology of its own for collision and accident prevention. It may have a lifting device (79') for picking up and removing a tray stack (77) at a bottom-side storage place., e.g., at a support frame (79") located there. The transport vehicles, which are preferably present as a plurality of transport vehicles, may have an energy supply of their own, which they carry along, e.g., a rechargeable electrical battery. They may be moving in a swarm in the tray stack storage unit (78). The automated stack transport (79), especially autonomic transport vehicles, can be remote-controlled via a fleet manager by preferably wireless communication.

The bottles are fed to the storage station (4), e.g., from the feed station (2) by means of a bottle conveyor (53) and are released from the storage station (4) to the handling station (3) by means of a row conveyor (71). The bottles (7) may also be delivered by a bottle conveyor, not shown, directly from the feed station (2) to the handling station (3), e.g., when the stations (2, 3) operate in the same cycle.

The bottle trays (5) are loaded each time with a fed group of bottles (6), a so-called bottle layer (7), and are stored in a tray storage unit (43, 44) and/or in a tray stack storage device (78). The bottle trays (5) are unloaded for the further handling of the bottles (6) and the bottles are removed in the form of a row. The loading and/or unloading of the bottle trays (5) is carried out by means of a loading device (11). The layer-forming device (9) is provided for forming a bottle layer (7) and the row-forming device (10) is provided for forming and filling a bottle row.

The bottles (6) are configured, e.g., according to FIG. 7, as hollow and closable containers. They may consist of plastic, metal or any other suitable material as desired. The bottles (6) may have in the side view and in the top view the asymmetric shape shown with multiple arches. The bottles (6) preferably have an upright shape with a relatively small base and with a height that is greater than the length or width of the base. The bottles (6) shown have a limited positional stability in the upright position. They may possibly fall over, especially when they are empty.

The bottles (6) have a bottle body (6') and, preferably on the upper side, an upright, e.g., tubular bottle neck (6"). As an alternative, they may have another type of bottle opening, which will likewise be called bottle neck below. The bottle neck (6") is arranged, e.g., eccentrically. The bottles (6) may have a desired orientation for the handling, especially filling, and the bottle neck (6") is arranged, e.g., in front of the center of the bottle in the conveying direction.

FIGS. 15 through 24 show the configuration of a bottle tray (5). This is shown schematically in FIGS. 15 and 16. FIGS. 17 through 24 show exemplary configuration details in different views.

The bottle tray (5) has an upright and, e.g., rectangularly extending side wall (12). This is formed according to FIGS. 17 through 24 by corner elements (22) and panels (73). The bottle tray (5) is manufactured from metal and, e.g., from bent plates in the embodiment shown. As an alternative, it may consist of a plastic or another material.

Figure 18:
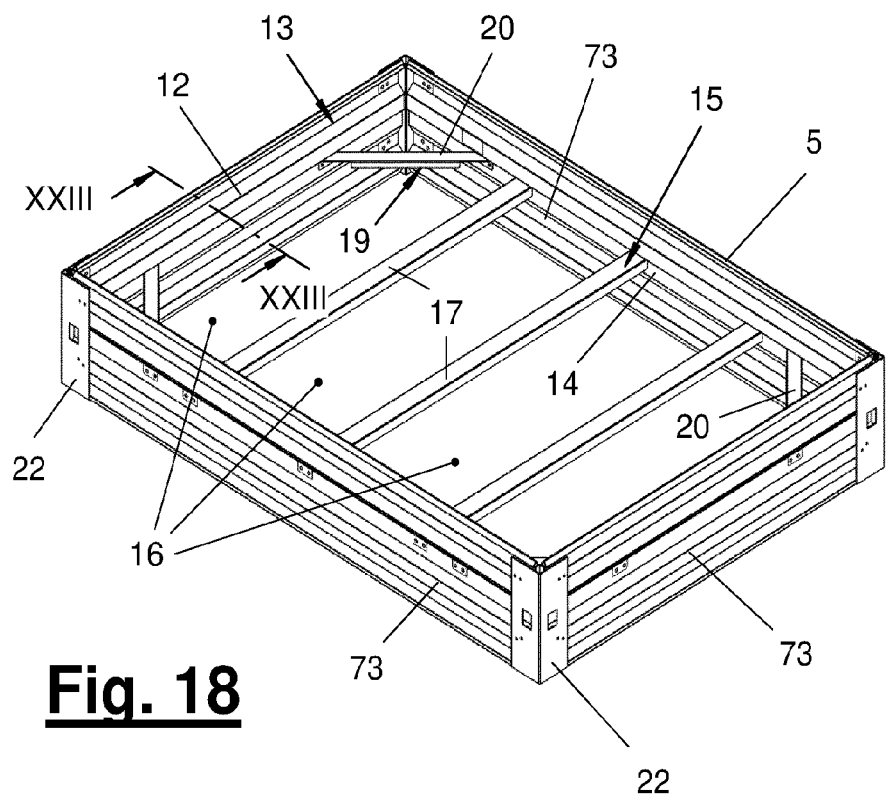
FIG. 18 is a perspective view of the bottle tray according to FIG. 17 without lifting bottom.
Figure 20:
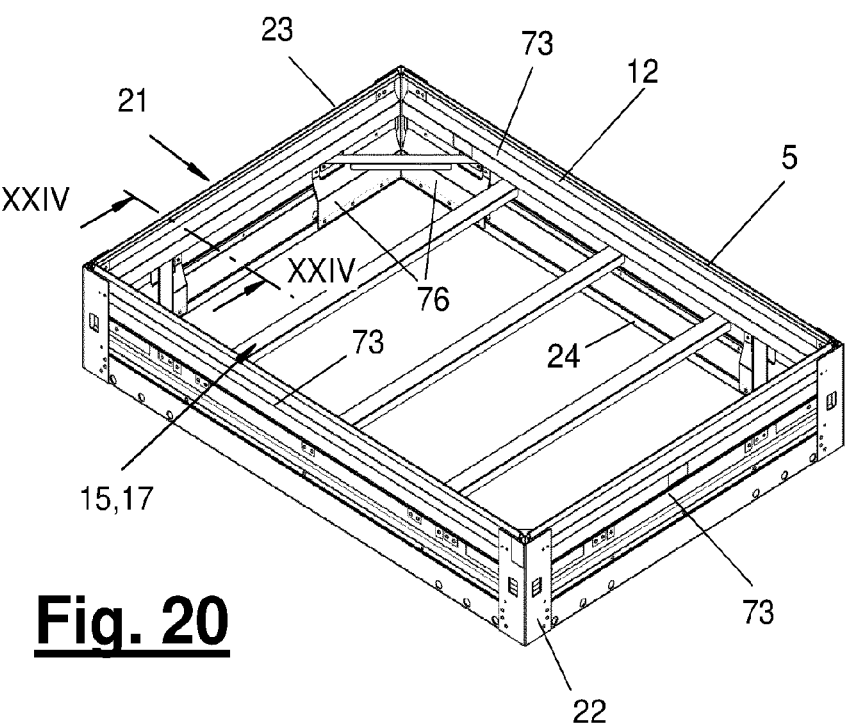
FIG. 20 is a variant of the bottle tray in a perspective view.

The side wall (12) has in both variants an upper edge (23) and a lower edge (24) as well as an upper tray opening (13) enclosed by the side wall (12). FIGS. 18 and 20 show two variants of the configuration of the lower edge (24).

The bottle tray (5) has, furthermore, a tray bottom (15), which is permanently connected to the side wall (12) and which has a plurality of passage openings (16). The tray bottom (15) has for this purpose, e.g., a plurality of struts (17), which are located laterally at spaced locations from one another and abut each against the side wall (12) on the front side and are fastened for this purpose, e.g., by welding. Said passage openings (16) are formed between the parallel struts (17). As an alternative, the tray bottom (15) may have a different configuration, e.g., in a grid-like shape with struts crossing one another, as a perforated plate with passage openings or in another manner.

The bottle tray (5) has a mobile lifting bottom (18), which has a plate shape and is inserted loosely in the bottle tray (5). The lifting bottom (18) lies on the tray bottom (15) in the loaded state. The lifting bottom (18) is located at a spaced location on the edge side from the side wall (12). The bottle layer (7) stands on the flat lifting bottom (18) in the loaded state. The base of the bottle layer is, e.g., smaller than the area of the lifting bottom.

Figure 15:
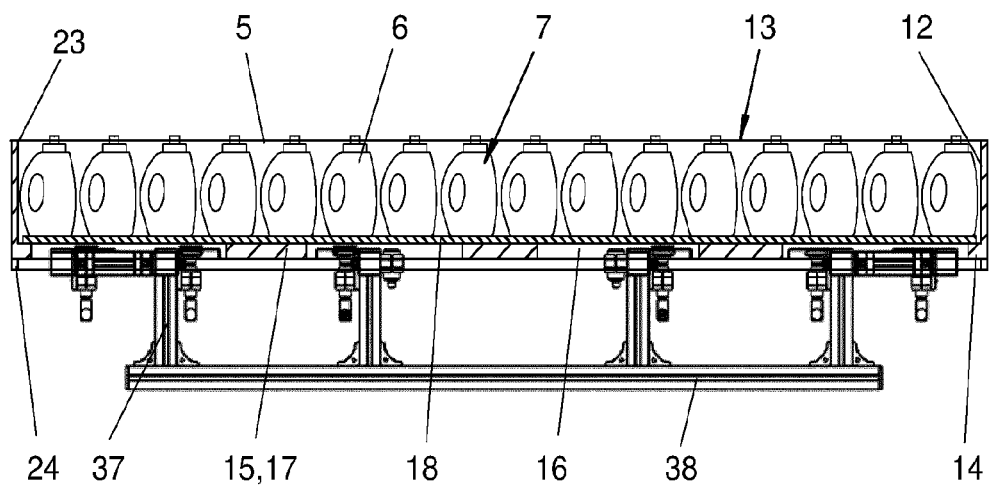
FIG. 15 is a side view of the lifting unit with a bottle tray and with a bottle layer in the loading position.
Figure 16:
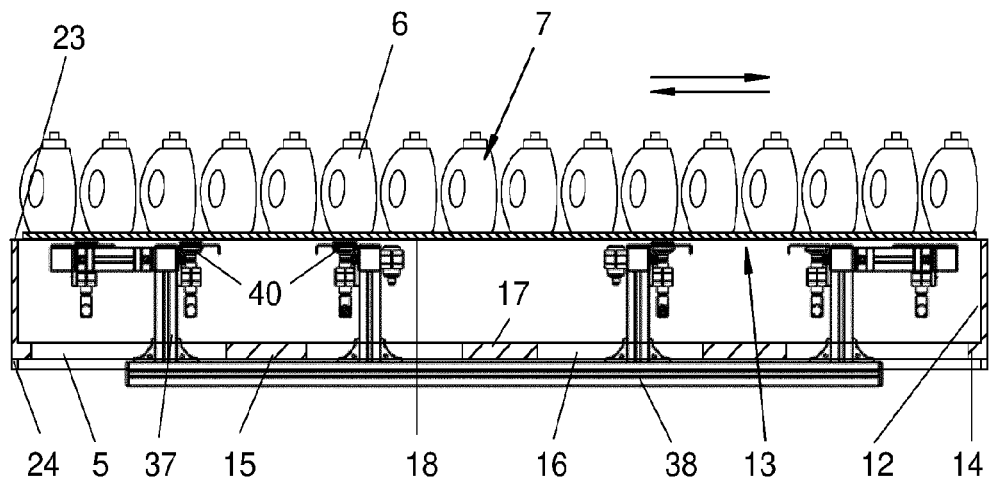
FIG. 16 is a cut-away view of the arrangement according to FIG. 15 in the push-off position.
Figure 17:
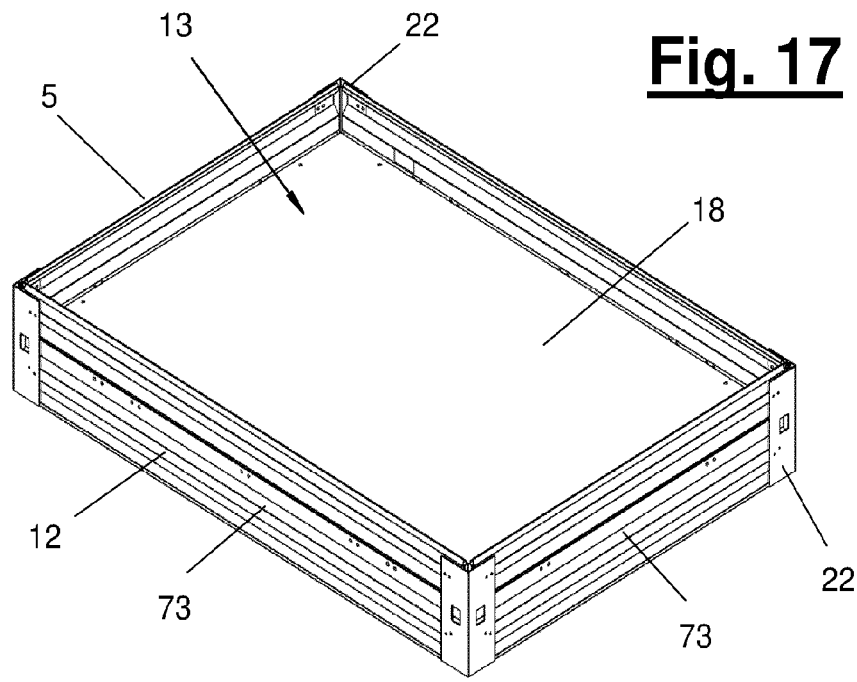
FIG. 17 is a perspective view of a bottle tray with lifting bottom.
Figure 19:
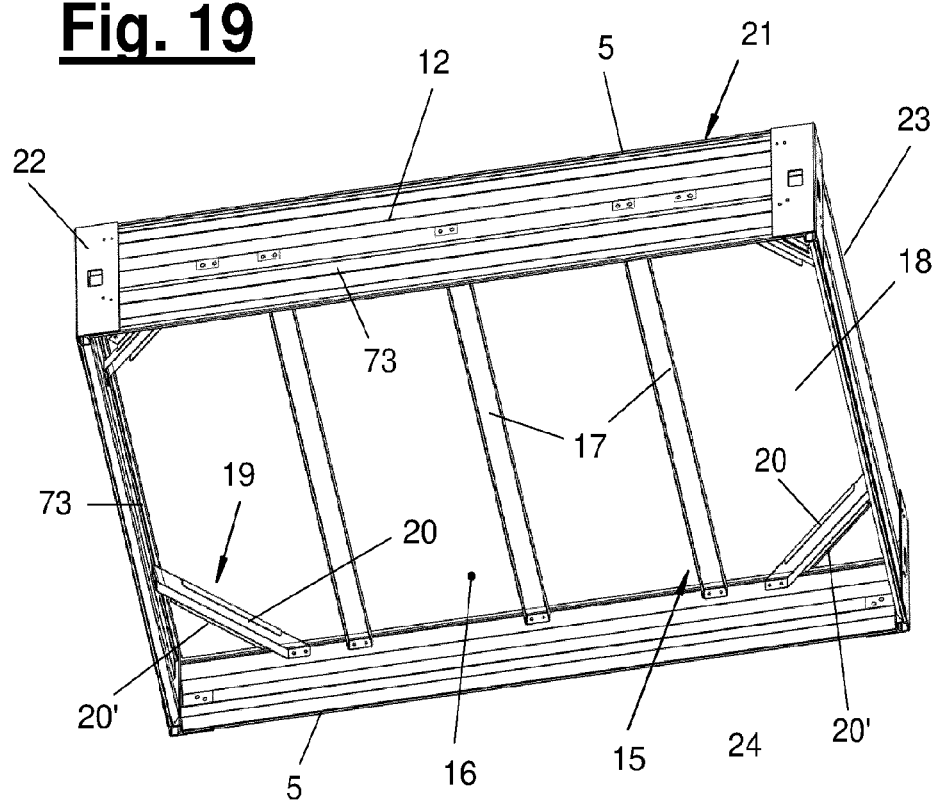
FIG. 19 is a bottom view of the bottle tray according to FIG. 17.

FIG. 17 shows the bottle tray (5) with the lifting bottom (18) inserted. The bottle tray (5) is shown in FIGS. 18 and 19 without lifting bottom (18) in a perspective view with a view from the top and from the bottom. FIGS. 15 and 16 show the lifting bottom (18) and the bottle layer (7).

Figure 23:
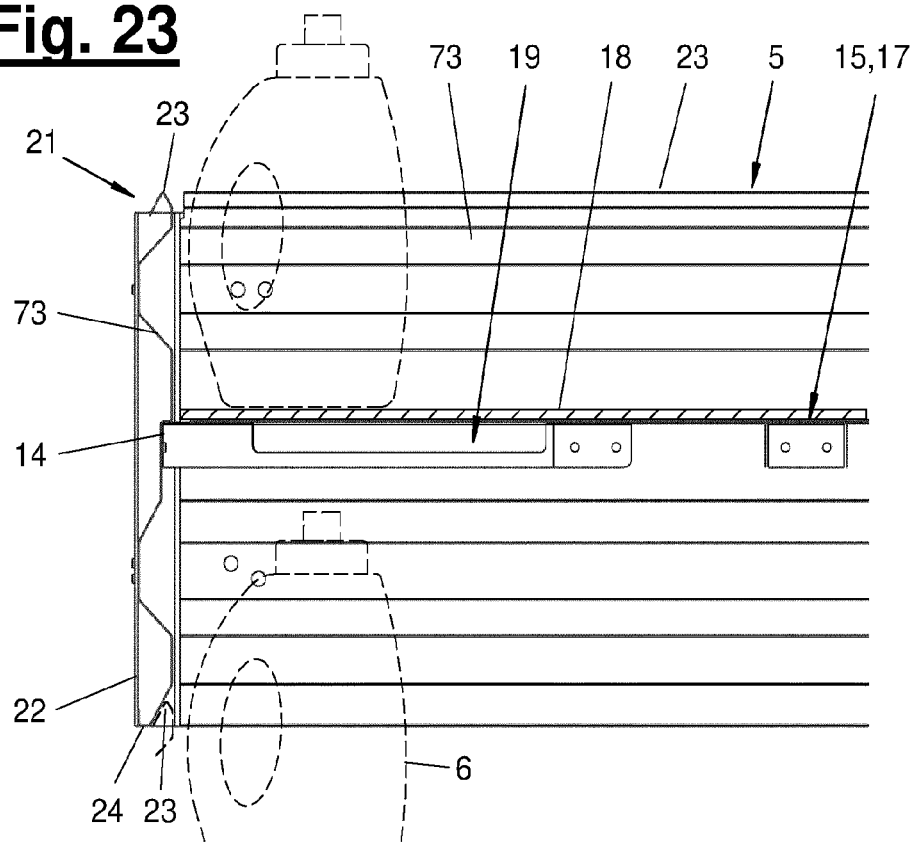
FIG. 23 is a sectional view through the side wall of the bottle tray at a corner area according to the section line XXIII-XXIII in FIG. 18.
Figure 24:
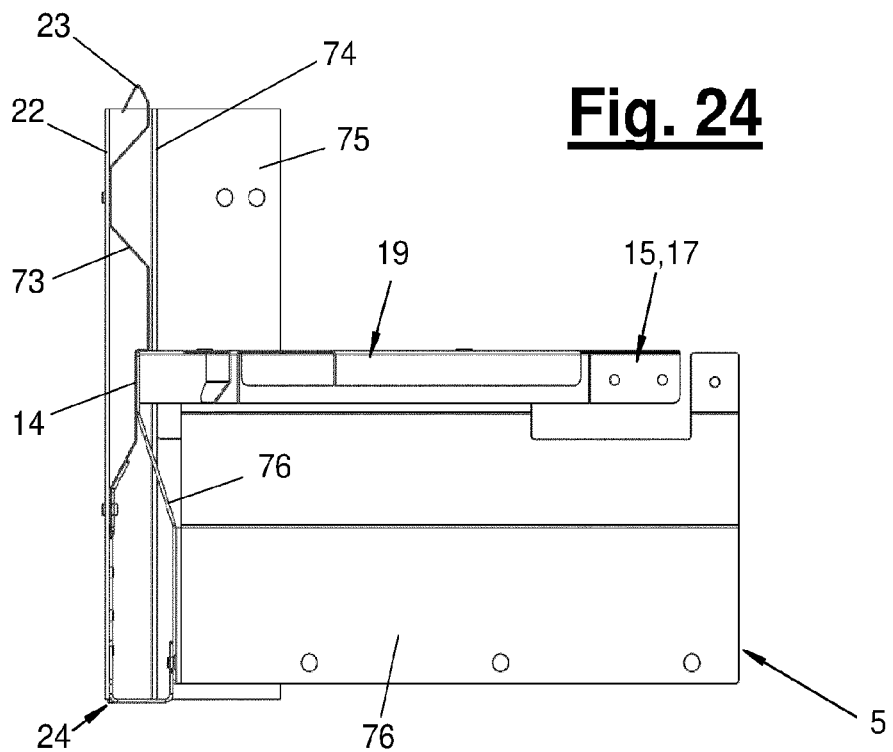
FIG. 24 is a sectional view through the side wall of the bottle tray variant at a corner area according to the section line XXIV-XXIV in FIG. 20.

The tray bottom (15) is arranged in the central area of the height of the side wall. FIGS. 18 and 20 as well as the sections in FIGS. 23 and 24 show this arrangement. The tray bottom (15) adjoins, e.g., an indentation (14) of the side wall (12), which indentation is oriented towards the interior of the tray, and is fastened here.

The bottle tray (5) has a bottom centering unit (19) for the lifting bottom (18). This centering unit acts, e.g., between the tray bottom (15) and the lifting bottom (18). FIGS. 18 through 20 show this arrangement. In the embodiment shown, the bottom centering unit has obliquely arranged centering devices (20, 20') in the corner areas of the tray bottom (15) and of the lifting bottom (18). These are configured, e.g., as parallel centering strips (20') arranged obliquely in the corner area on the underside of the lifting bottom (18) and as centering beams (20) in the area of the tray bottom (15), which are in contact with one another in a positive-locking and guiding manner in the loading position. The centering devices (20, 20') may have at their contact points complementarily beveled side walls, which ensure a mutual positive-locking guide and orientation during the approaching motion between the lifting bottom (18) and the tray bottom (15).

The bottle tray (5) further has a tray centering unit (21), which ensures a centering meshing of the bottle tray (5) in a tray stack (77) with another bottle tray (5). A tray stack (77) is suggested in FIG. 6.

FIGS. 23 and 24 show this arrangement. The tray centering unit (21) is formed by, e.g., beveled panel edges at the upper and lower edge (23, 24) of the side wall (12). These bevels are oriented obliquely and parallel to one another. They mesh in a positive-locking manner during stacking according to FIG. 23.

The corner elements (22) are formed by an upright angular column (74), e.g., a square section, and by an outer-side collar (75), which is bent diagonally and which covers the adjoining panels (73) in some areas on the outside. The panels (73) project upward at the upper tray edge (23) over the angular column (74) and the collar (75). The angular columns (74) and the collar (75) end at the lower edge (24) at the edge of the panel.

When bottle trays (5) are stacked one upon another, they stand with their corner elements (22) on one another and are guided and held via the bottle centering unit (21) with the panel edges located obliquely in contact with one another in the overlap area of the adjacent corner elements (22).

FIGS. 20 and 24 show a variant of the bottom tray (5). This is suitable, e.g., as a lowermost tray in a tray stack (77) and can have an especially good supporting effect for the tray stack (77). The bottle tray (5) has an edge reinforcement (76) on the inner side of the side wall (12), which may be arranged especially in the corner area of the bottle tray (5). The edge reinforcement (76) widens the panel (73) formed, e.g., by a canted plate in the lower area. In addition, a U-shaped bottom rail, which offers a flat support surface and closes and covers the corner element (73) downwards, may be arranged at the lower edge (24).

The bottle tray (5) may have a position centering unit for the bottle layer (7) picked up. This position centering unit may consist, e.g., of edge-side guide strips on the inner side of the side wall (12), which are placed inside and are pressed against the bottle layer (7 by the force of gravity, by springs or in another manner. They are configured and arranged such that the lifting bottom (8) can move past them without collision.

FIG. 15 shows a loading position with the lifting bottom (18) lowered and with pick-up of a bottle layer (7) in the bottle tray (5). FIG. 16 shows the lifting bottom (8) in a raised position, in which the upper side of the lifting bottom (18) closes flush with the upper edge (23) of the bottle tray (5) or is arranged slightly above it. A bottle layer (7) can be pushed off from the loading device (11) onto the lifting bottom (18) in this position for loading the bottle tray (5). Arrows suggest this pushing motion.

The loading device (11) is arranged at the storage station (4) in the exemplary embodiments shown. A loading device (11) can be assigned to each tray storage unit (43, 44) in the tray station (4) shown in FIGS. 1 and 25 with two separate tray storage units (43, 44). For example, a bottle layer (7), which is located for this purpose at a loading location (48) in the tray storage unit (43), is loaded into a bottle tray (5) with the loading device (11) at the feed-side tray storage unit (43) according to FIGS. 1 and 2. A loaded bottle tray (5) can be unloaded from the loading device (11) at the other, discharge-side tray storage unit (44) and the loading location (48) thereof The bottle trays (5) remain now in the storage station and are transported to the loading location (48) by a storage conveyor (50) explained below for the loading and/or unloading operations.

In another embodiment, not shown, a storage station (4) may have only one tray storage unit as well as possibly a tray stack storage unit (78) and only one loading location (48), at which the loading and also the unloading of a bottle tray (5) take place. The loading location (48) may also be arranged outside of a tray stack storage unit (78) and be connected to this via a tray conveyor.

The loading devices (11) for loading and unloading may have the same basic construction. They comprise a layer pusher (25) for the monoaxial or multiaxial pushing of a bottle layer (7) and a lifting device (34), which brings about a relative lifting motion between the side wall (12) and the mobile lifting bottom (18) of the bottle tray (5). The layer pusher (25) and the lifting device (34), which are equipped with corresponding drives (28, 29), are controlled such that the layer pusher (25) pushes a bottle layer (7) onto the lifting bottom (18) or pushes it off from the lifting bottom (18) when the lifting device (34) has brought the lifting bottom (18) in the bottle tray (5) according to FIG. 16 into a position favorable for pushing at the upper tray opening (13).

The lifting device (34) is located in the embodiments shown at the respective loading location (48) in the storage station (4). The layer pusher (25), which is mobile monoaxially or multiaxially by means of a corresponding guide (26), can move to the loading location (48) and to the lifting device (34) and can move again away from this. The layer pusher (25) can move in the process into the storage station (4) and also move again out of it. This motion may be a monoaxial motion. The layer pusher (25) may also carry out a multiaxial, especially biaxial traveling and pushing motion when bottle layers (7) are fed to the loading device (11) and are removed from same in two or more parallel rows. The second motion axis may be oriented at right angles to the first axis and parallel to the front side of the storage station (4).

The loading device (11) may have a layer conveyor (42) for a bottle layer (7), which layer conveyor is arranged upstream or downstream of the lifting device (34). The layer conveyor (42) may be configured, e.g., according to FIGS. 8 and 10, as an endlessly running conveyor driven in a controlled manner. It moves the bottle layer (7) in a respective conveying direction (60). The layer conveyor (42) may be located at a spaced location from the lifting device (34), in which case a stationary loading table (32) is arranged between them according to FIGS. 8 and 10. The loading table (32) adjoins the lifting device (34) and the lifting bottom (18) located in a raised position. As an alternative, the loading table (32) may be omitted and the layer conveyor (42) may correspondingly adjoin the lifting device (34).

As is shown in FIGS. 5 through 8 as well as in FIGS. 15 and 16, the passage openings (16) at the tray bottom (15) are intended for the lifting device (34) and they make possible the relative lifting between the side wall (12) and the lifting bottom (8). The lifting device (34) has to this end a lifting unit (36), which can reach through the passage openings (16) and can act on the underside of the lifting bottom (18). The lifting unit (36) is mobile vertically in the exemplary embodiments shown and is raised and lowered by a lifting drive (39) relative to a stationary frame (35) with a preferably vertical and straight lifting motion.

The bottle tray (5) and the side wall (12) are arranged here stationarily at the loading location (48) and are positioned by a positioning device (41) for the loading and unloading operation. The positioning device may have, e.g., according to FIG. 5, a plurality of stationary positioning stops, at which the bottle tray (5) is held and guided in a suitable manner, and is possibly also locked by clamping devices or the like. In another embodiment, the side wall (12) can be raised and lowered relative to a stationary lifting unit (36) with the lifting bottom (18) overlying here.

As is shown in FIGS. 13 through 16, the lifting unit (36) has a plurality of switchable and adhesive holding elements (40) acting on the lifting bottom (18). These preferably act on the underside of the lifting bottom (8). The adhesive holding elements (40) are configured as switchable suction units in the exemplary embodiments shown. As an alternative or in addition, a configuration as switchable electromagnets or another configuration is possible. The holding elements (40) are arranged in a two-dimensional or flat distribution.

Figure 13:
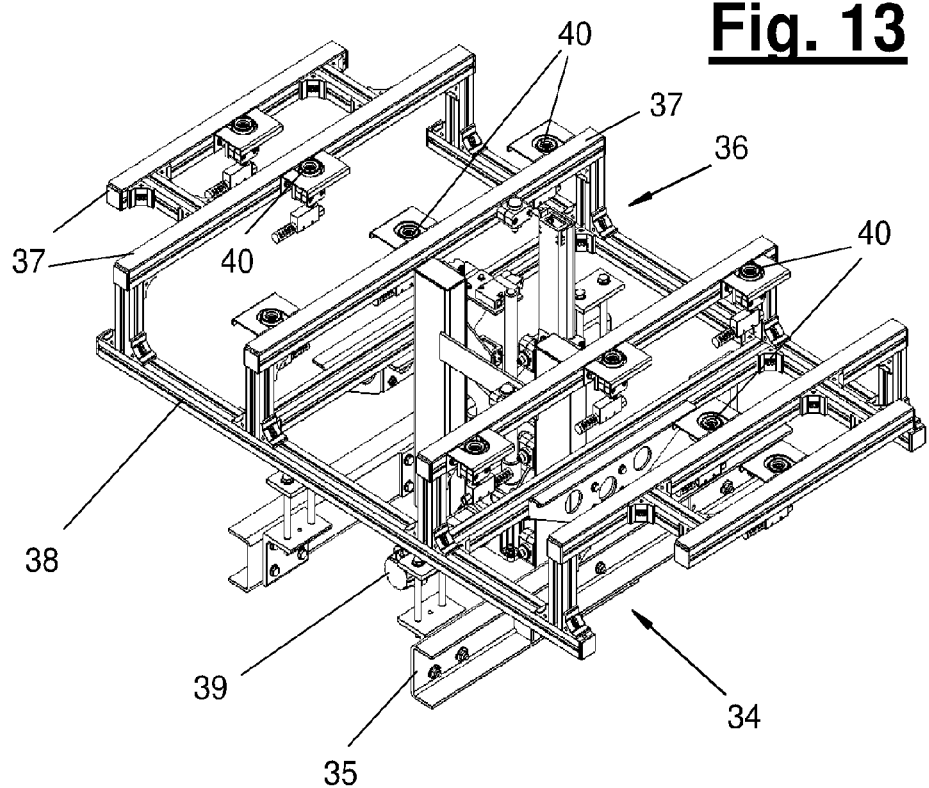
FIG. 13 are perspective view of a lifting unit of the loading device.
Figure 14:
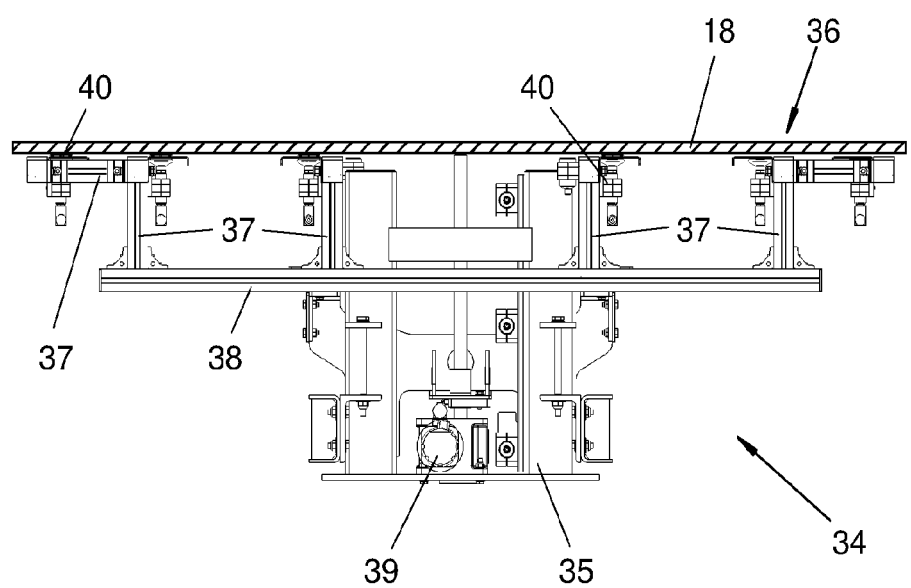
FIG. 14 is a side view partially sectional view of the lifting unit of the loading device.

In the embodiments shown, the lifting unit (36) has a plurality of strap-like lifting carriers (37), which are adapted to the passage openings (16) and can pass through these. The lifting carriers (37) carry each one or more holding elements (40) on their upper sides. FIGS. 13 and 14 show this arrangement. The lifting carriers (37) are connected to one another to form a lifting carrier frame (38), which is acted on, e.g., by the lifting drive (39) and can be raised and lowered in the process relative to the frame (35). The frame (35) has to this end a suitable guide oriented in the preferably vertical lifting direction for the lifting carrier frame (38).

The lifting carriers (37) are arranged at the same level with their upper support surfaces and holding elements (40) located there and hold the mobile lifting bottom (18) on the underside thereof according to FIGS. 15 and 16. The lifting carrier frame (38) and the lifting carriers (37) are shown in the lowered loading position in FIG. 15 and in the raised position for pushing a layer in FIG. 16.

Figure 2:
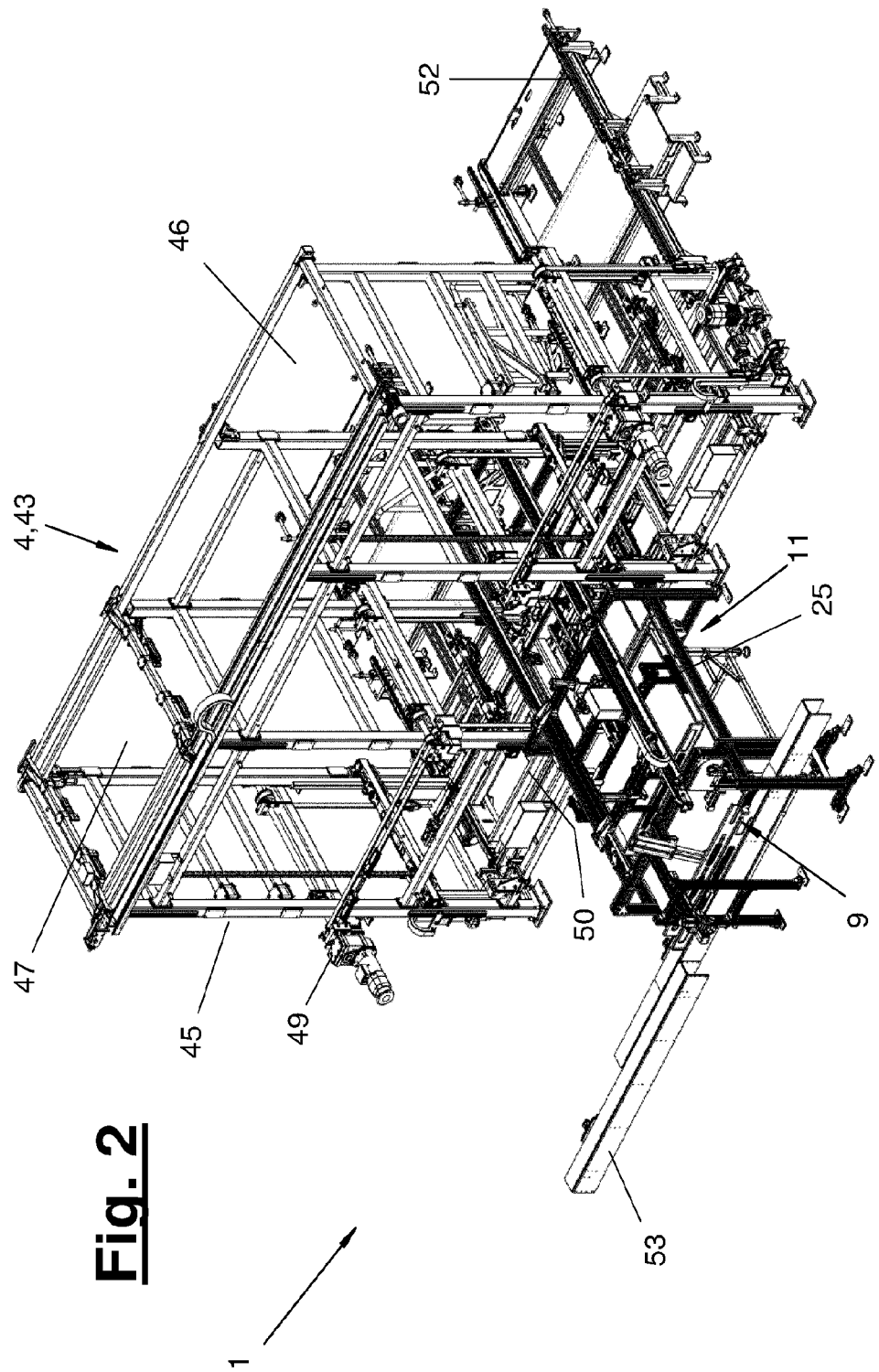
FIG. 2 is a perspective view of a storage station with a layer-forming device and with a loading device.
Figure 3:
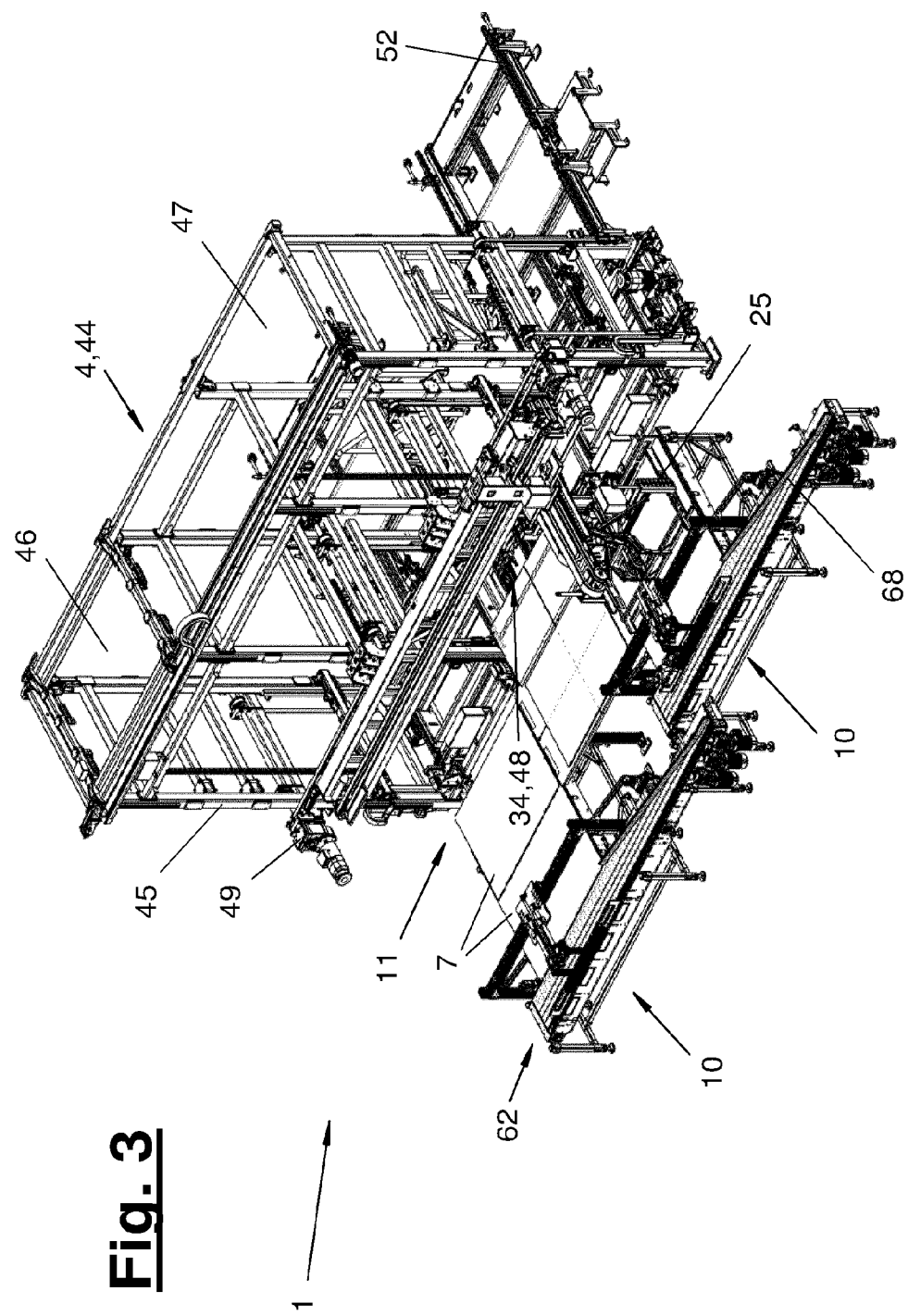
FIG. 3 is a perspective view of a storage station with a loading device and with a row-forming device.

The layer pusher (25) is arranged according to FIGS. 2 as well as 6 through 8 at the guide (26) and can be moved monoaxially or multiaxially with the drive (28) in the above-described manner. The layer pusher (25) comprises a pusher frame (27), which can enclose the bottle layer (7) laterally and guide it. The pusher frame (27) has, e.g., a shape that corresponds to that of the layer and is rectangular in the top view. The pusher frame (27) has a plurality of frame parts (29, 30, 31), which can be fed laterally to the bottle layer (7).

The lateral frame parts (29) are oriented along the conveying direction (60) and bring about a lateral guiding of the bottle layer (7). The pusher frame (27) makes it possible to push in a bottle layer (7) being conveyed. To this end, it has a front-side frame part (30), which is oriented transversely to the conveying direction (60). The frame part (30) can be fed, on the one hand, on the front side to the bottle layer (7) in the manner as mentioned. It can, in addition, be raised and lowered by means of a suitable drive. It can be lifted off upwards and it can release the access into the interior of the pusher frame (27) for pushing in a bottle layer (7) being conveyed. The transversely oriented frame part (31), which is the rear frame part in the conveying direction (60), can likewise be able to be raised and lowered in the manner described.

For loading, the pusher frame (27) can be opened on the front side with the frame part (30) raised, and a bottle layer (7) can be conveyed into the pusher frame (27) and then enclosed by the lowered frame part (30) and the other fed frame parts (29, 31) on all sides and clamped and held with a certain feeding force. The bottles (6) are pushed together tightly in the process in the bottle layer (7).

The layer gripper (25) is then moved with the bottle layer (27) to the loading location (48) and to the bottle tray (5) standing ready there and is pushed over the raised lifting bottom (18). The lifting bottom (18) and the bottle layer (7) can then be lowered after release by the layer gripper (25) and picked up in the bottle tray (5). The loaded bottle tray (5) can then be moved from the loading location (48) by the storage conveyor (50) to one of the storage areas (46, 47) and stored there. A new empty bottle tray (5) can subsequently or simultaneously be made available for the loading operation at the loading location (48).

Figure 4:
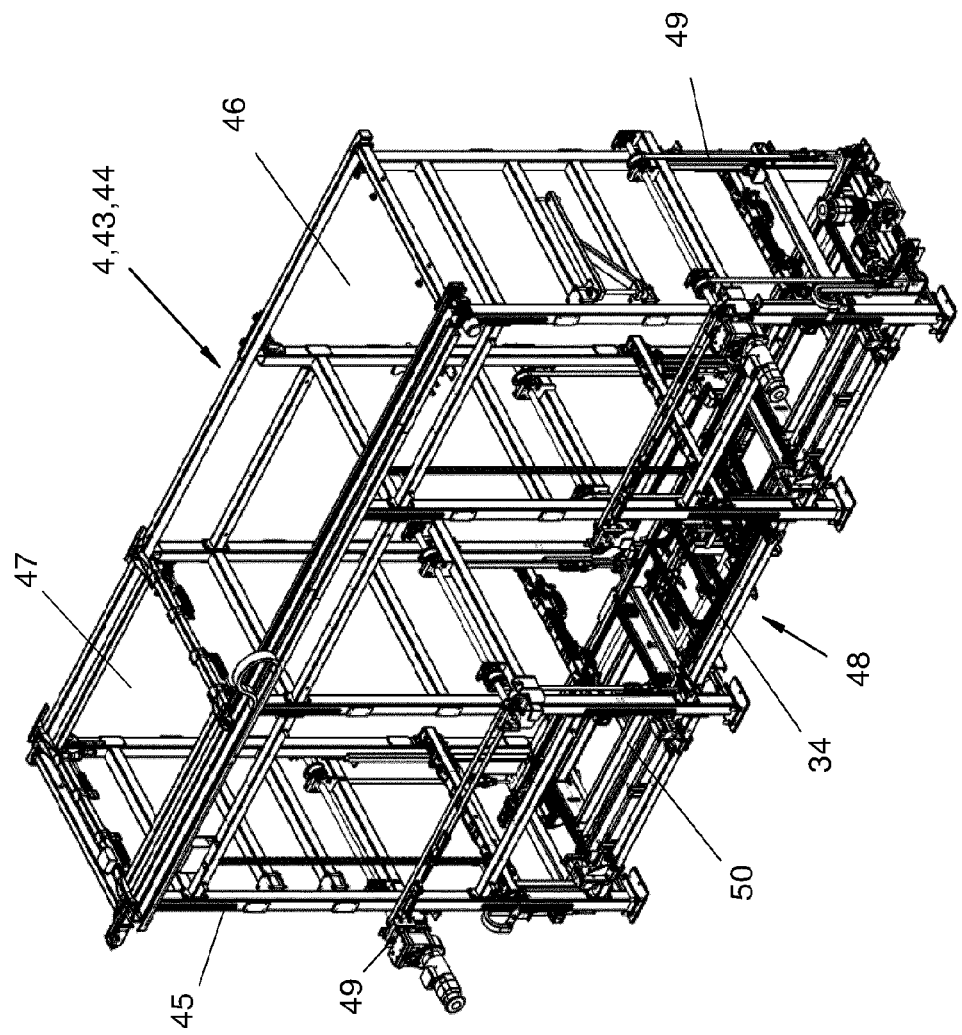
FIG. 4 is a perspective view of the storage station with a loading location and with a lifting device of a loading device as well as with a storage conveyor.
Figure 5:
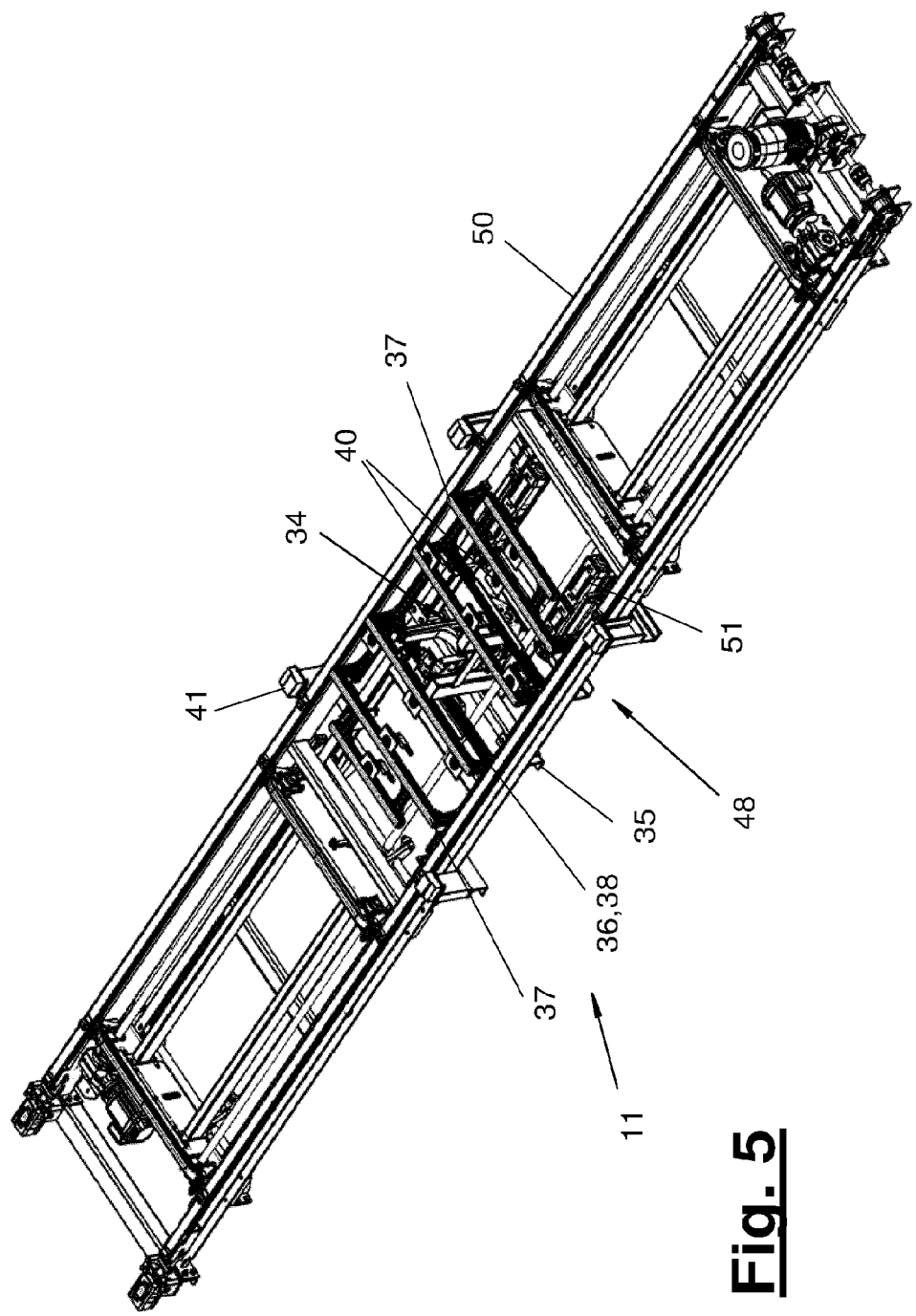
FIG. 5 is a detail view of the storage conveyor from FIG. 4.
Figure 9:
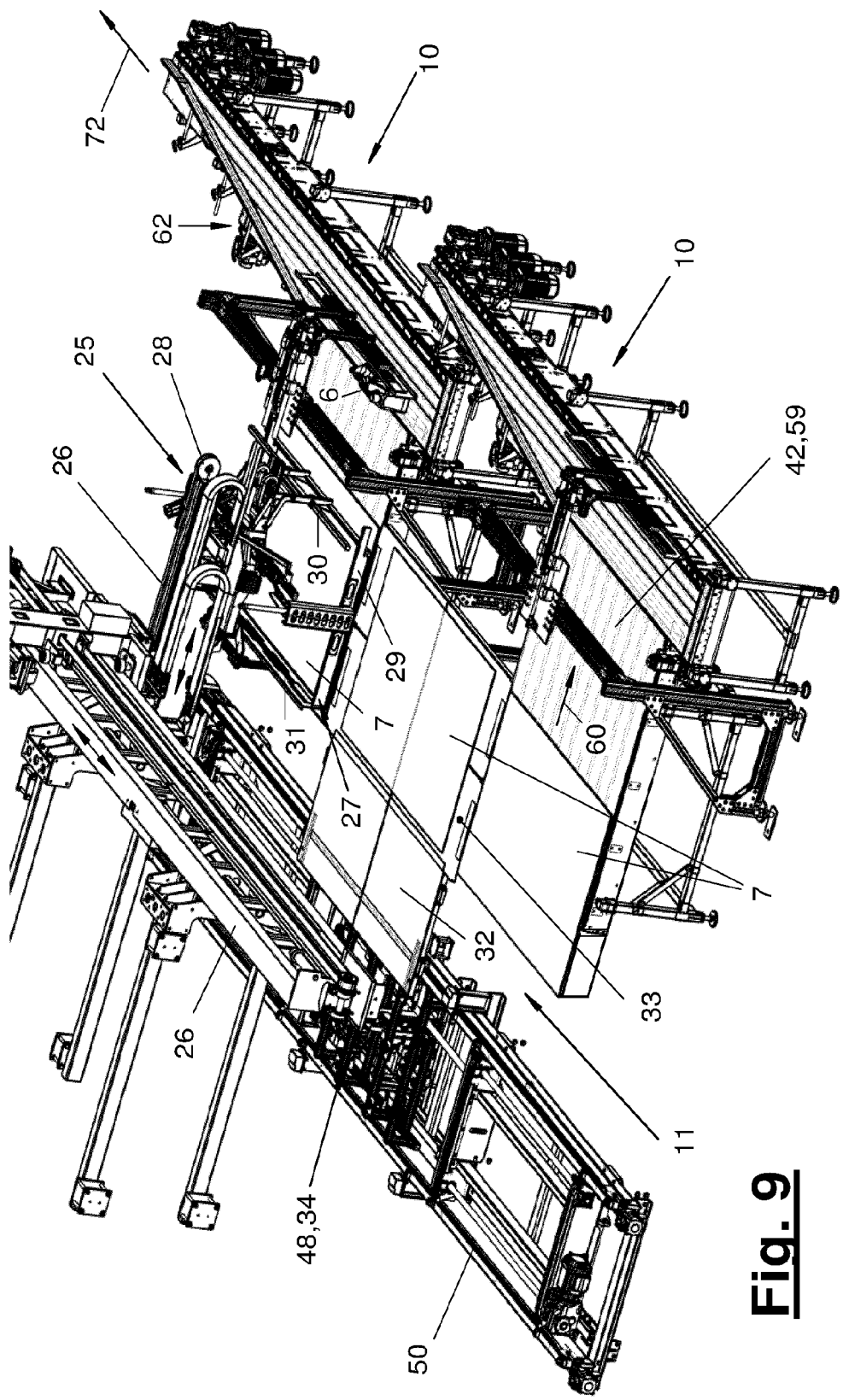
FIG. 9 is a perspective view of the loading device and of the row-forming device according to FIG. 3 with other angles of view and without the storage technology.

FIGS. 4 and 5 show the configuration of a tray storage unit (43, 44) and of the storage conveyor (50). The tray storage unit (43, 44) has a, for example, a frame-like frame (45) and said two or more storage areas (46, 47) as well as the preferably central loading area (48). The storage areas (46, 47) are configured, e.g., for storing a respective tray stack (77) and they have a storage device (49), with which the respective lower bottle tray (5) is fed for storage to the tray stack (77) or is removed from the tray stack (77) for removal from storage.

The storage device (49) has for this purpose, e.g., lifting grippers for raising and lowering the respective lower bottle tray (5) and a holding device for the tray stack (77). The lower bottle tray (5) can be released with this holding device for the removal from storage, while the rest of the tray stack (77) is being supported and held. For storage, the tray stack (77) is held and the lower bottle tray (5) is likewise gripped after feeding and is supported and held in contact with the rest of the tray stack (77).

A respective tray conveyor (52) each can be connected to one or more storage areas (46, 47). Tray stacks (77) or individual bottle trays (5) can be fed to or removed from a storage area (46, 47) by a tray conveyor (52).

The storage conveyor (50) shown separately in FIG. 5 connects the storage areas (46, 47) and the loading area (48). It has to this end a suitable conveying device, e.g., parallel guide rails and bilateral belt conveyors. The storage conveyor (50) further comprises a lifting unit (51), with which said conveying device can be raised and lowered. One or more, e.g., two bottle trays (5) can be conveyed to and fro in the raised position. An empty bottle tray (5) can be moved to the loading location (48) and transferred in the lowered position to the positioning device (41). At the same time, a bottle tray (5) located at the loading location (48) can be removed. In addition, positioning devices for the bottle tray (5), which cooperate with the storage device (49), may be present at the storage conveyor (50) in the area around the storage areas (46, 47).

Said layer forming device (9) may be arranged upstream of the loading device (11). This layer-forming device is shown in more detail in a first embodiment in FIGS. 2 as well as 6 through 8. FIG. 29 shows a variant. The layer-forming device (9) has, in both variants, e.g., a bottle conveyor (53), a row guide (45) and a row pusher (56) as well as a layer conveyor (58). This may be a separate layer conveyor. The layer-forming device (9) and the loading device (11) have, for example, a common layer conveyor (42, 58) in the embodiments shown.

The bottle conveyor (53) is connected, e.g., to the feed station (2). The bottle conveyor (53) moves the bottles (6), e.g., in a single bottle row (8) to a point located in front of the layer conveyor (58). The bottle conveyor (53) is configured and controlled here such that it forms a discrete bottle row and a so-called layer row (54), which is separated from the other bottles (6) fed and is spaced apart in the conveying direction. FIG. 1 shows this embodiment.

The layer row (54) is then pushed off by the row pusher (56) transversely to its extension or in the conveying direction (60) and is pushed onto a last layer row of the bottle layer (7) being formed and is brought into contact. The bottle layer (7) is formed on the layer conveyor (58), which can be moved in a timed manner in the process. The row pusher (56) pushes the discrete layer rows (54) to form the bottle layer (7) one after another onto the layer conveyor (58), which moves on now or subsequently by the width of a layer row each in the conveying direction (60).

To form a discrete layer row (54), which is separated from the other bottles (6), the bottle conveyor (53) has a conveying device, e.g., an endless bottom-side conveyor belt, and a clamping device, a stop or the like for the other arriving bottles (6), under which the conveying device can, e.g., slip through. Further, a possibly mobile and controllable stop may be arranged for the discrete layer row (54) on the front side at the bottle conveyor (53).

The layer-forming device (9) has a row guide (55) for the discrete layer row (54). The row pusher (56) may be configured as a part of the row guide (55). It has, for example, in the first variant, an individual pusher strip oriented along the discrete bottle row (54) and an adjusting device, which is arranged, e.g., hanging at a traveling carriage and can be moved in the conveying direction (60) by means of a suitable drive. The pusher strip of the row pusher (56) is located behind the discrete bottle or layer row (54) in the conveying direction (60).

The row guide (55) may have on the other side a raisable and lowerable guide element (57). This is arranged in front of the discrete layer row (54) when viewed in the conveying direction (60). The guide element (57) forms in the lowered position a part of the row guide (55) for forming the discrete layer row (54). The guide element (57) can then be raised and it makes possible in the raised position the passage of the pusher strip of the row pusher (56) and of the discrete layer row (54) in the conveying direction (60). After return of the row pusher (56) and of the guide element (57) into the starting position, the row guide (55) can be closed and a discreet layer row (54) can be formed again.

In the second variant of FIG. 29, the layer-forming device (9) has one or preferably more row guide(s) (55), which have each two parallel guide elements (55') connected permanently to one another, which pick up between them a layer row (54) made available at the bottle conveyor (53). The row pusher (56) moves the row guide(s) (55) and the guide elements (55') thereof. It has an endless conveyor (56') with one carrier and preferably with more lifting carriers (56"), at which a respective row guide (55) each is arranged in a raisable and lowerable manner. The row guide(s) (55) and its (their) guide elements (55') is/are pulled with a lowering motion of its/their guide elements (56") over the layer row (54) provided at the bottle conveyor (53) and then moved by the endless conveyor (56') in the conveying direction (60) as well as adjoined in the rear to the partially formed layer (7). The lifting carrier (56") then raises again the row guide(s) (55) and the guide elements (55') thereof and releases the layer row (54). The raised row guide(s) (55) and guide elements (55') are then moved by the endless conveyor (56') back to the bottle conveyor (53), after which the cycle starts anew. The endless conveyor (56') is configured, e.g., as an endlessly running belt conveyor and has a plurality of lifting carriers (56") located at spaced locations in the running direction with a respective row guide (55).

A distance, through which the frame element (30) of the layer gripper (25) can reach the rear side of the front bottle layer (7) and contact this, can be created during the formation of the bottle layers (7) according to FIG. 1 between the front and finished bottle layer (7) and the bottle layer (7) formed next. The frame element (30) can perform, e.g., a pivoting motion in the process.

FIGS. 9 through 12 show the other loading device (11) on the removal side of the storage station (4). The loading device (11) likewise has a layer pusher (25) and a lifting device (34) as well as a layer conveyor (42) of the above-described type.

The cycle takes place in the reverse order during the unloading operation. The lifting bottom (18) of the loaded bottle tray (5) is raised with the bottle layer (7), and the bottles (6) dip in the process into the pusher frame (27), which was made available and widened before. After feeding the frame parts (29, 30, 31), the layer pusher (25) pushes the bottle layer (7) off from the lifting bottom (18), which can then be lowered, empty, into the bottle tray (5). The unloaded or empty bottle tray (5) can then be removed and a new, loaded bottle tray (5) can be made available at the loading area.

The bottle layers (7) unloaded from the bottle tray (5) are removed in the embodiment shown in two parallel lines by means of second, separate layer conveyors (42). The guide (26) and the layer pusher (25) have the above-mentioned, second motion axis for this purpose. In addition, a distribution table (33), which extends to the two layer conveyors (42) and on which the unloaded bottle layers (7) can be displaced transversely by the layer pusher (25), is arranged adjacent to the loading table (32). The layers (7) are shown symbolically in FIGS. 3, 9, 10 and 11.

The discharge-side loading device (11) is adjoined by a row-forming device (10). This is present as two devices in the exemplary embodiments shown, and a single arrangement or an arrangement of more than two devices is possible as an alternative. The respective row-forming device (10) and the loading device (11) may have each a common layer conveyor (42, 59) with a conveying direction (60).

Figure 10:
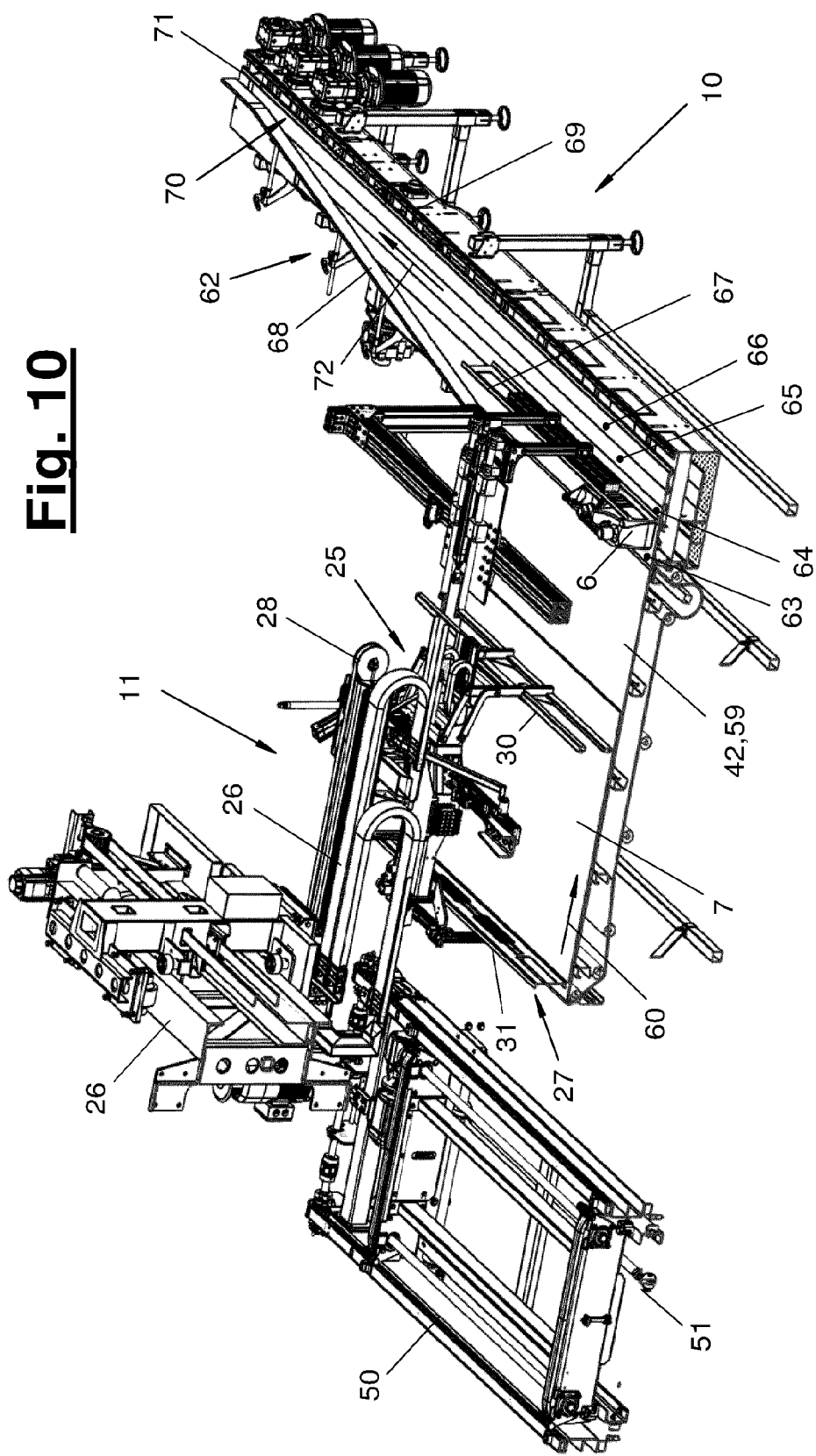
FIG. 10 is a sectional view through the arrangement according to FIG. 9.
Figure 11:
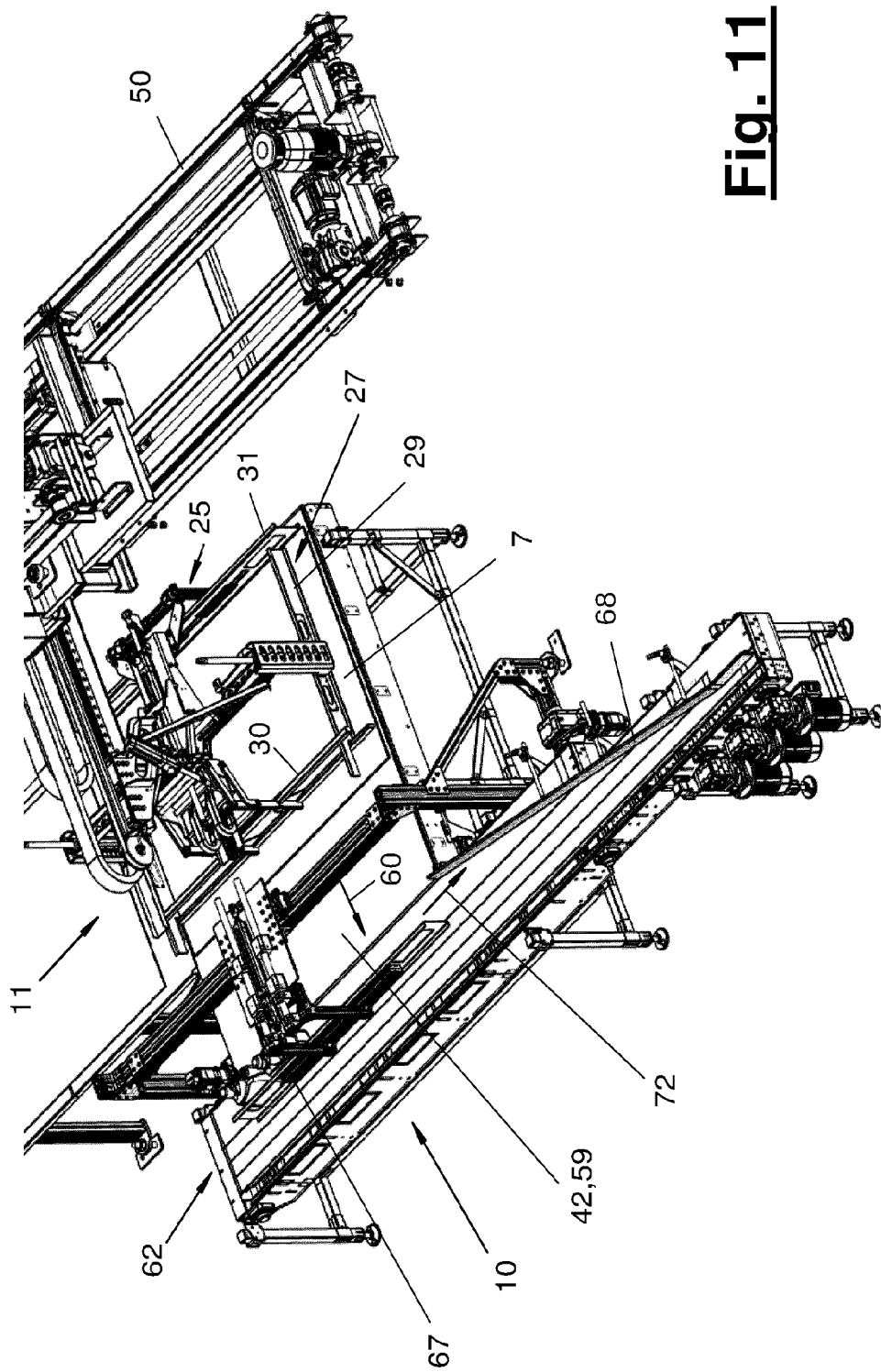
FIG. 11 is an enlarged perspective view of a row-forming device according to FIG. 3.
Figure 12:
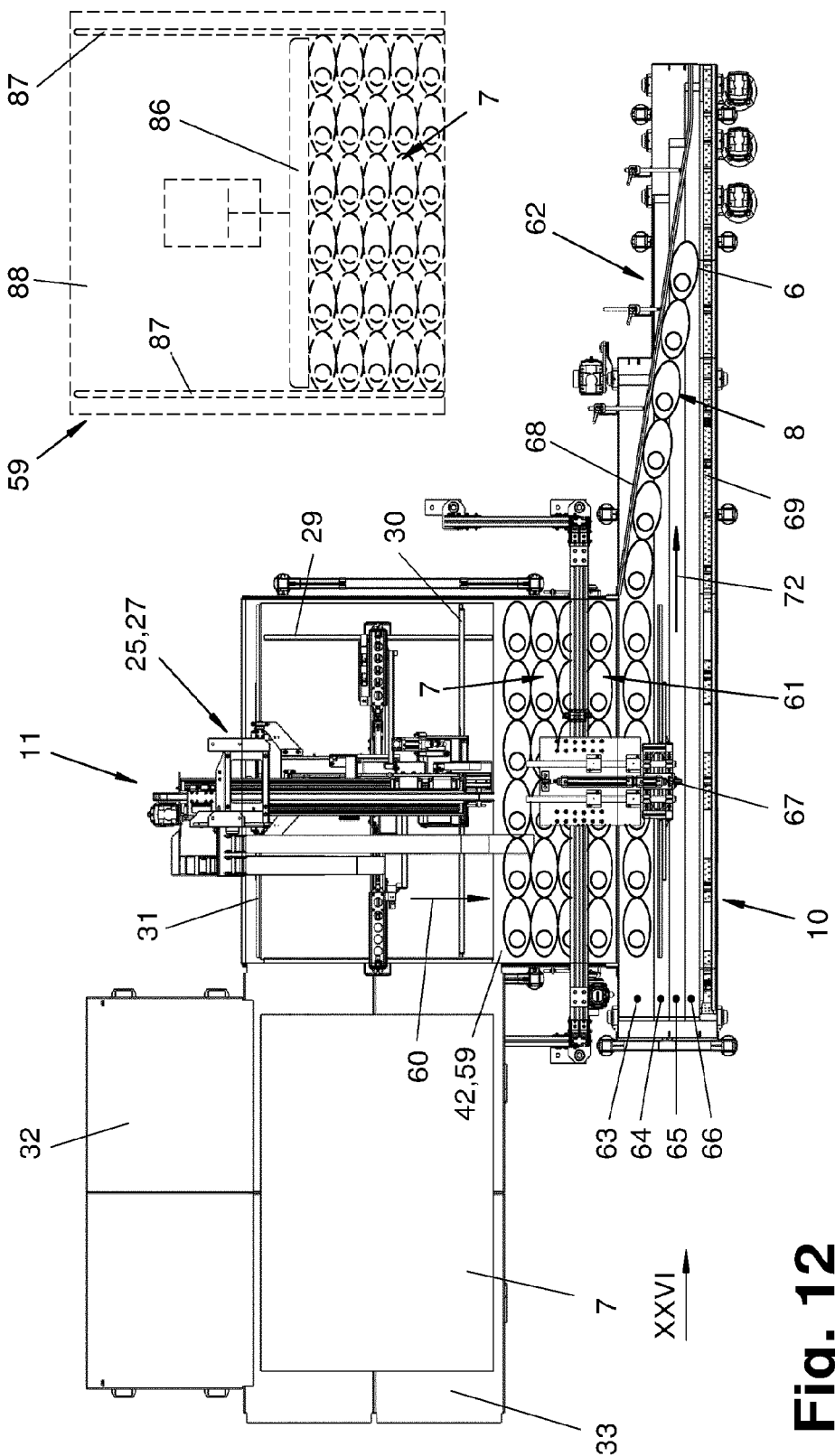
FIG. 12 is a top view of the arrangement according to FIG. 11 with bottles.
Figure 26:
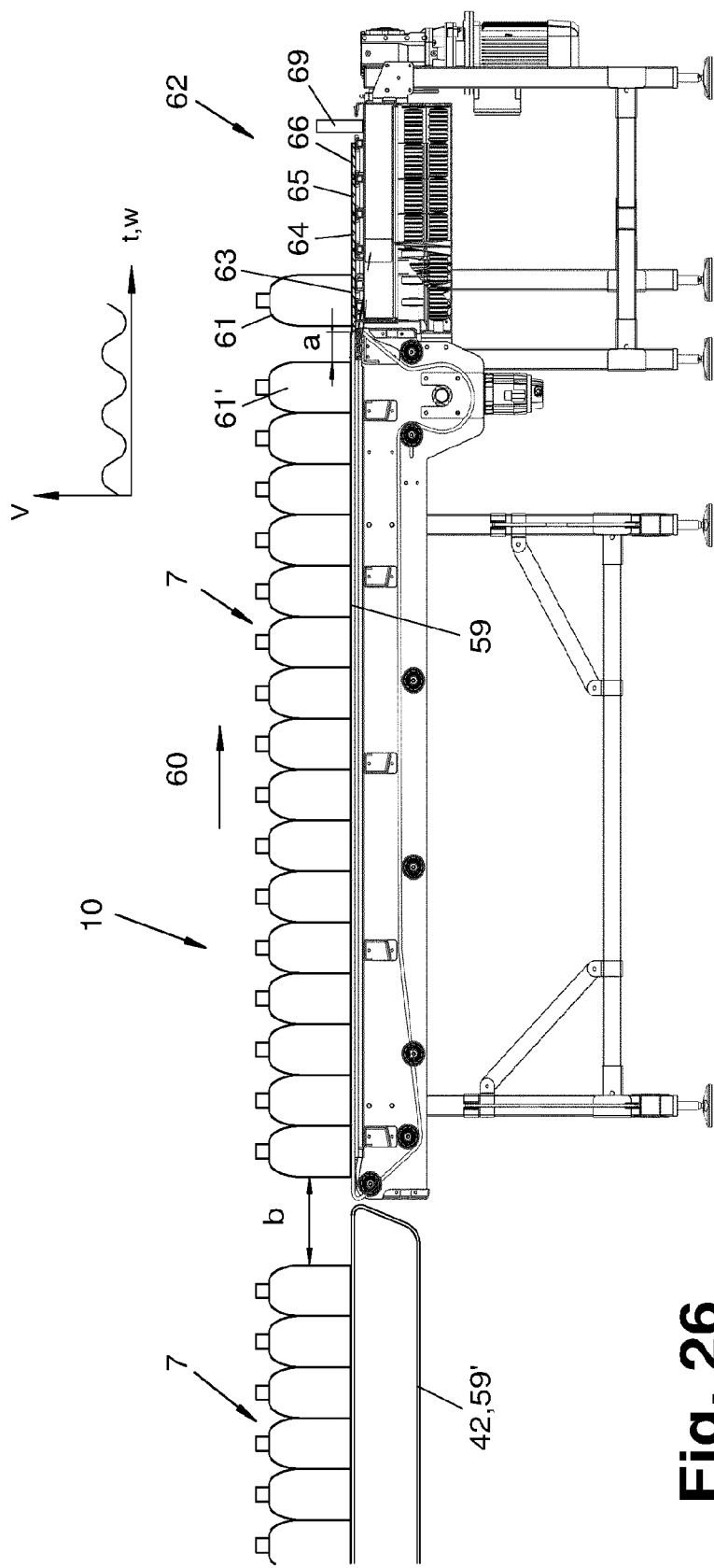
FIG. 26 is a front view of the row-forming device according to arrow XXVI in FIG. 11.

The layer conveyor (42, 59) may be configured, e.g., according to FIGS. 10 and 26, in the above-described manner as an endless, controllably driven conveyor belt. FIG. 12 shows by broken lines a variant of the layer conveyor (59), which is formed here by a layer pusher (86) working in the conveying direction (60) and by a side guide (87) as well as by a base (88), e.g., a table or a conveyor belt.

The row-forming device (10) has the function of picking up and removing the respective frontmost layer row (61) of bottles of the bottle layer (7) being moved in the conveying direction (60) one by one in rows. This is carried out in a transport direction (72) that is oriented transversely to the conveying direction (60). FIG. 12 and FIG. 26 show this function and configuration in a top view and in a front view according to arrow XXVI.

The row-forming device (10) has a transport device (62) with a plurality of, e.g., four parallel conveyor belts (63-66). These extend in said transport direction (72). The conveyor belts (63-66) are driven each independently. They can run faster than the layer conveyor (59) and, e.g., the conveyor belt thereof.

The transport device (62) adjoins the layer conveyor (59) directly or via a push-off strip. When the layer conveyor (59) pushes the frontmost layer row (61) beyond this limit onto the first conveyor belt (63) running transversely to the conveying direction (60), this conveyor belt carries the bottles (6) of the layer row (61) along in the transport direction (72) and also pulls them in the process away from the layer conveyor (59). A distance (a) to the layer row (61') following next is formed due to the pulling off according to FIG. 26. To compensate this distance (a), the layer conveyor (59) may briefly accelerate and increase the conveying speed until the layer row (61') of bottles following next will have reached the limit to the transport device (62). The conveying speed can then be reduced again.

The cycle is repeated after the layer row (61') has been pulled off, so that the conveying speed of the layer conveyor (59) has the pulsating course suggested in the diagram shown in FIG. 26 over the conveying path or over time.

The conveyor belts (63-66) may have different conveying speeds. There is a speed gradient, which increases when viewed in the conveying direction (60). The transport speed increases continuously from one conveyor belt to the next. The transport speeds may also be equal between individual conveyor belts (63-66) or all conveyor belts (63-66).

The conveyor belt (63), which is the first conveyor belt in the conveying direction (60) and adjoins the layer conveyor (42, 59) directly or via a push-off strip, has the lowest speed. It may also have the greatest width. The conveyor belts (64, 65, 66) following in the conveying direction (60) have each a higher speed and a smaller width than the first conveyor belt (63). The outermost conveyor belt (66) has the highest transport speed. The individual bottle row (8) released from the row-forming device (10) is ultimately also formed and removed on this conveyor (66).

The bottles (6) are picked up upright and on the upper run on the bottom-side conveyor belts (63-66). The upper runs are always moved in the process in the same transport direction (72).

The transport device (62) further has a preferably straight guide strip (68) oriented obliquely in relation to the transport direction (72). This guide strip adjoins, when viewed in the transport direction (72), the layer conveyor (42, 59). It extends, starting from the layer conveyor (42, 59), over a part of the conveyor belts (63, 64, 65) and preferably reaches the outer conveyor belt (66). The oblique position has a direction component in the transport direction (72).

The layer row (61) picked up by the first conveyor belt (63) is conveyed in the direction (72) and comes into contact with the guide strip (68), while it is obliquely deflected and is pushed over the additional conveyor belts (64, 65). The differences in the speed of the conveyor belts (63, 64, 65) drive the bottle feed along the oblique guide strip (68).

The guide strip (68) extends over the first three conveyor belts (63, 64, 65) and ends at or in front of the fourth conveyor belt (66). The obliquely guided bottle row (8) then reaches the last and fastest conveyor belt (66). It is carried along by this in the transport direction and is deflected in the process. The bottle row (8) is guided now by an edge guide (69) arranged behind the conveyor belt (66) when viewed in the conveying direction (60). An additional guiding device, which acts in a guiding manner on the other side of the conveyor belt (66), may adjoin the free end of the oblique guide strip (68). The oblique guide strip (68) is shown in the drawings for the sake of better illustration in a somewhat different position, in which it reaches the last conveyor belt (66).

The transport device (62) may have, furthermore, a guiding device (67), which is oriented along the transport direction (72) and which is arranged at the rear edge of the first conveyor belt (63) when viewed in the conveying direction (60). It guides the layer row (61) located on the first conveyor belt (63) in the transport direction (72). The guiding device (67) may be adjustable with a suitable adjusting device. It may be set, e.g., to different bottle formats and may also be removed as needed.

The conveyor belts (63, 64, 65, 66) may have a different longitudinal extension each when viewed in the transport direction (72). This creates space for the arrangement of the respective corresponding belt drives. The last conveyor belt (66) has the greatest length and adjoins a row conveyor (71), which runs farther. This transports then according to FIG. 1 the bottle row (8) to the handling station (3).

The row-forming device (10) may be operated in different manners. This may depend, e.g., on the bottle shapes. In one variant, the layer conveyor (59) and the transport device (62) may be moved each intermittently in a timed manner. The layer conveyor (59) now pushes the frontmost layer row (61) over the currently stationary first conveyor belt (63). The layer row (61) can be brought into contact now with the correspondingly positioned guiding device (67). The layer conveyor (59) then stops, while the transport device (62) is activated and removes the bottles (6) of the layer row (61) in the transport direction (72). After removal of the layer row (61), the transport device (62) will stop again, and the cycle will then start anew and the next following layer row (61') is pushed over the transport device (62).

In another variant, the layer conveyor (59) and the transport device (62) with their conveyor belts (63-66) can run each continuously. The layer conveyor (59) pushes the front layer row (61) over said limit in the above-described manner until it is carried along by the first conveyor belt (63) and is removed in the transport direction (72). The layer conveyor (59) can run at a constant speed or it can have the above-mentioned pulsating, e.g., sinusoidal profile, The conveyors belts (63-66) may run permanently and at constant speed. As an alternative, the conveyor belts (63-66) may also have a variable and especially pulsating speed profile.

FIG. 26 shows, in addition, an embodiment of the row-forming device (10), in which a plurality of layer conveyors (59, 59') are arranged in the conveying direction (60) one after another. The one front layer conveyor (59) adjoins, e.g., the transport device (62). The rear layer conveyor (59') is coupled, e.g., with the loading device (11) and takes over the layer (7) unloaded from the bottle tray (5). The layer conveyor (59') may form the layer conveyor (42) of the loading device (11) or it may be an intermediate conveyor.

Due to the timed unloading of the bottle trays (5), the unloaded bottle layers (7) have a distance (b) suggested in FIG. 26 between them in the conveying direction.

In order to make possible a continuous and possibly gap-free formation and release of bottle rows (8), the distance (b) can be reduced. The upstream layer conveyor (59') may run to this end faster from time to time than the downstream layer conveyor (59). It can now bring the bottle layer (7) being conveyed into a close contact with the bottle layer (7) located on the layer conveyor (59).

Figure 27:
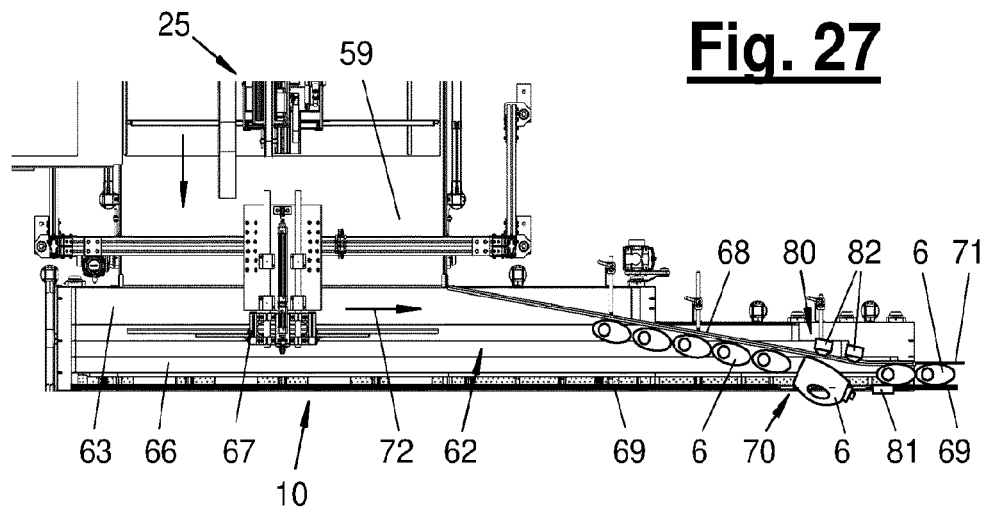
FIG. 27 is a top view showing a row-forming device with a removing device.

FIG. 27 shows a row-forming device (10) with an outlet (70) for fallen-over or otherwise abnormal bottles (6). A removing device (80) may be arranged at the outlet (70). The outlet (70) may be located, e.g., at the transition of the transport device (62) into the row conveyor (71). A bottleneck may be formed here due to the oblique guide strip (68). The outlet (70) may be configured as an opening in an edge guide (69) located opposite to the guide strip (68). The edge guide (69) may be arranged at the row conveyor (61) and optionally at the transport device (62), especially at the last conveyor belt (66).

A fallen-over or otherwise abnormal bottle (6) can be detected by a sensor (81). Depending on the result of the detection, an ejector (82) of the removing device (80) can be activated for ejecting this bottle (6).

The sensor (81) is configured, e.g., as an optical sensor, which is arranged in or at the edge guide (69) and emits a detection beam in the direction of the edge guide (69) and via the outlet (70). A fallen-over bottle (6) extends farther away from the oblique guide strip (68) than a correctly and upright standing bottle (6). The fallen-over bottle (6) interrupts thereby the detection beam and triggers the ejection function. Correctly standing and transported bottles (6) do not enter into the area of the detection beam and do not trigger the ejection function.

The sensor (81) may be configured, e.g., as an optical sensor in the manner of a reflected light scanner or in another manner. The ejector (82) may comprise, e.g., one or more blowing nozzles and blow the bottle to be removed with an air jet through the outlet (70) into an external collection container or the like. The ejector (82) may have, as an alternative, a different configuration, e.g., a configuration of an extendable flap or plunger.

The orientation of the bottles (6) in their conveying direction may change during the above-described removal of the bottles (6) of the front layer row (61) from the layer conveyor (59). The bottles (6) may rotate about their vertical axes, e.g., due to contact and carrying by the conveyor belt (66), and this rotation does not take place all the time or it does not always take place to an equal extent. The bottle neck (6") may come to lie in front of or behind the center of the bottle in the conveying direction due to said change in orientation. Constant orientation of the bottles is favorable for the subsequent handling, e.g., filling, of the bottles (6).

Figure 28:
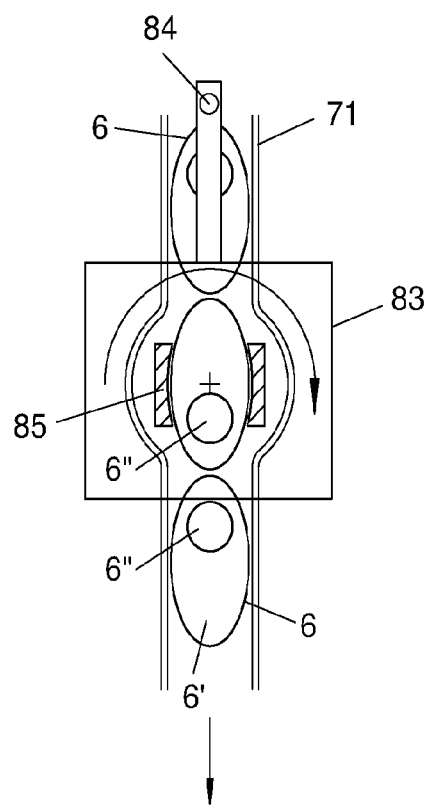
FIG. 28 is a top view of a row conveyor with a turning device.

To eliminate possible incorrect orientations of bottles (6), a turning device (83) may be arranged at the row conveyor (71) or at another suitable location according to FIGS. 1 and 28. This has, e.g., a turning unit (85), which can correct an incorrect orientation of a bottle (6). It can grip, for example, the bottle (6) in question preferably laterally and turn it by 180° about its vertical axis. The side guide of the bottle or row conveyor (71) has a corresponding bulge in the turning area. The turning unit (85) is formed, e.g., by controllably driven gripping jaws, which can be fed to the bottle (6), especially to the bottle body (6') and whose shape is possibly adapted, and which can rotate about said vertical axis by 180°. The turning operation can be carried out very rapidly and during the transportation of the bottle.

The turning device (83) may have a sensor (84) arranged upstream of the turning unit (85), with which the orientation of the arriving bottles can be detected and an incorrect orientation can be detected. The turning unit (85) can be correspondingly actuated via the sensor (84) and an analysis unit.

Various variants of the embodiments shown and described are possible. The storage station (4), the layer-forming device (9), the row-forming device (10) and the loading device (11) are independent inventive components. These may also be manufactured and sold individually. They may be used to retrofit or convert existing bottle handling plants (1).

Further, it is possible to combine the storage station (4), the layer-forming device (9), the row-forming device (0) and the loading device (11) with one another in any desired manner and to any desired extent. Conventional components may also be used in such a combination.

A storage station (4) may be arranged, for example, separately in space from a loading device (11). The bottle trays (5) may be loaded and unloaded now outside of the storage station at an external loading location and are transported to the storage station (4) and back for storing and removing from storage according to a separate conveying technology. The storage station (4) may be configured now in any other desired manner.

Further, it is possible to configure a loading device (11) in another and conventional manner with gripping devices and to combine it with a layer-forming device (9) and/or with a row-forming device (10) of the above-described and claimed type.

Further, a bottle tray (5) equipped with a mobile lifting bottom (18) may be modified. The tray bottom (15) may be omitted in favor of an individual, large lower passage opening. The side wall (12) is configured in this case as a peripheral frame, which may have an upper tray opening (3) and a free lower passage opening (16) having essentially an equal size. The embodiment of the side wall (12) may also vary in favor of straight side walls or another embodiment. The mobile lifting bottom (18) may be arranged at the lower edge (24) of the side wall (12) and held in a suitable manner, e.g., by enclosing support edges at the side wall. The loading device (11) may be correspondingly adapted now and may otherwise be configured in the above-described and claimed manner. The layer-forming device (9) and/or the row-forming device (10) of the above-described and claimed type may be combined as well.

On the other hand, the loading device (11) being described and claimed may be combined with other and conventional layer-forming devices (9) and/or row-forming devices (10).

While specific embodiments of the invention have been shown and described in detail to illustrate the application of the principles of the invention, it will be understood that the invention may be embodied otherwise without departing from such principles.

LIST OF REFERENCE CHARACTERS

1 Bottle handling plant
2 Feed station
3 Handling station
4 Storage station
5 Bottle tray
6 Bottle
6' Bottle body
6" Bottle neck, bottle opening
7 Bottle layer
8 Bottle row
9 Layer-forming device
10 Row-forming device
11 Loading device
12 Side wall
13 Tray opening
14 Indentation
15 Tray bottom
16 Passage opening
17 Strut
18 Lifting bottom
19 Bottom centering unit
20 Centering device, centering beam
20' Centering device, centering strip
21 Tray centering unit
22 Corner element
23 Upper edge
24 Lower edge
25 Layer pusher
26 Guide
27 Pusher frame
28 Drive
29 Frame part, lateral
30 Frame part, front side
31 Frame part, rear
32 Loading table
33 Distribution table
34 Lifting device
35 Frame
36 Lifting unit
37 Lifting carrier, strap-like
38 Lifting carrier frame
39 Lifting drive
40 Adhesive holding element, suction unit
41 Positioning device
42 Layer conveyor
43 Tray storage unit
44 Tray storage unit
45 Frame
46 Storage area
47 Storage area
48 Loading area
49 Storage device
50 Storage conveyor
51 Lifting unit
52 Tray conveyor
53 Bottle conveyor
54 Layer row
55 Row guide
56 Row pusher
56' Endless conveyor
56" Lifting carrier
57 Guide element
57' Guide element
58 Layer conveyor, conveyor belt
59 Layer conveyor, conveyor belt
59' Layer conveyor, conveyor belt
60 Conveying direction
61 Layer row, frontmost
61' Layer row, next following 62 Transport device
63 Conveyor belt
64 Conveyor belt
65 Conveyor belt
66 Conveyor belt
67 Guiding device
68 Guide strip, oblique
69 Edge guide
70 Outlet
71 Row conveyor
72 Transport device
73 Panel
74 Angular column
75 Collar
76 Edge reinforcement
77 Tray stack
78 Tray stack storage unit
79 Stack transporter
79' Lifting device
79" Support frame
80 Removal device
81 Sensor
82 Ejector
83 Turning device
84 Sensor
85 Turning unit
86 Layer pusher
87 Side guide
88 Base, table
a Distance of layer rows
b Distance between bottle layers

The invention claimed is:

1. A row-forming device for forming a bottle row from a bottle layer, wherein the row-forming device is configured to pick up a single respective frontmost layer row of the bottle layer being moved in a conveying direction in rows in a transport direction transversely to the conveying direction and to remove the respective frontmost layer row of the bottle layer, wherein the row-forming device comprises:
one or more layer conveyors for the bottle layer; and
a transport device for the formed bottle row, wherein:
the layer conveyor moves the bottle layer in the conveying direction and adjoins the transport device;
the transport device comprises a plurality of parallel conveyor belts, which extend in the transport direction;
the parallel conveyor belts are driven independently;
the transport device comprises a guide strip, which is oriented obliquely in relation to the transport direction extends transversely to the transport direction and which extends over a part of the parallel conveyor belts and which is arranged behind the layer conveyor in the transport direction; and
the transport device comprises a guiding device, which is oriented along the transport direction, and which is arranged at a rear edge of a first conveyor belt, of the parallel conveyor belts, when viewed in the conveying direction, the guiding device being positioned and configured to guide the single frontmost layer row located on the first conveyor belt in the transport direction, and the guiding device being adjustable with an adjusting device.

2. A row-forming device in accordance with claim 1, wherein the conveyor belts have mutually different transport speeds with a gradient, which increases when viewed in the conveying direction.

3. A row-forming device in accordance with claim 1, wherein the row-forming device comprises an outlet and a removal device for fallen-over or other abnormal bottles and/or a turning device for bottles with an incorrect orientation.

4. A row-forming device in accordance with claim 1, wherein the conveyor belt that is the first conveyor belt when viewed in the conveying direction has a greater width than do the other conveyor belts.

5. A row-forming device in accordance with claim 1, wherein the conveyor belt that is the last conveyor belt when viewed in the conveying direction adjoins a row conveyor.

6. A row-forming device in accordance with claim 1, wherein the layer conveyor is configured to be moved intermittently or in a timed manner or continuously in the conveying direction.

7. A row-forming device in accordance with claim 1, wherein the layer conveyor has a variably controllable conveying speed and the variably controllable conveying speed is controlled such that after the frontmost bottle row of the bottle layer has been removed by the transport device, the next following bottle row is briefly accelerated and moved on rapidly, as well as positioned at a limit of the transport device, and the conveying speed is then reduced again for removing the positioned, next following bottle row.

8. A process for forming a bottle row from a bottle layer by means of a row-forming device, wherein a single respective frontmost layer row of the bottle layer being moved in a conveying direction is picked up in a transport direction transversely to the conveying direction and is removed, wherein the row-forming device has one or more layer conveyors for the bottle layer and a transport device for the bottle row, the process comprising:
moving the bottle layer with the layer conveyor in the conveying direction wherein the layer conveyor adjoins the transport device;
providing the transport device with a plurality of parallel conveyor belts, which extends in the transport direction;
driving the conveyor belts independently and at a same or at mutually different transport speeds;
providing the transport device with a guide strip oriented obliquely to the transport direction, which guide strip extends over a part of the conveyor belts and is arranged behind the layer conveyor in the transport direction, wherein the layer conveyor transfers only the respective single frontmost layer row of the bottle layer on the first conveyor belt of the transport device and in contact with an correspondingly positioned adjustable guiding device being oriented along the transport direction and being arranged at the rear edge of the first conveyor belt, wherein the transferred single frontmost layer row of the bottle layer is picked up and removed by the transport device being guided by the adjustable guiding device before the next frontmost layer row of the bottle layer is transferred on the transport device.

9. A bottle handling plant for handling bottles, the bottle handling plant comprising:
a feed station;
a handling station;
a storage station;
a plurality of bottle trays;
a loading device for loading and unloading a bottle tray, of the bottle trays, with a bottle layer; and
a row-forming device, for forming a bottle row from a bottle layer wherein the row-forming device is configured to pick up a respective frontmost layer row of the bottle layer being moved in a conveying direction in rows in a transport direction transversely to the conveying direction and to remove the respective frontmost layer row of the bottle layer, wherein the row-forming device comprises:
one or more layer conveyors adjoining the transport device for conveying the bottle layer, the layer conveyor being configured to move the bottle layer in the conveying direction; and
a transport device for the formed bottle row, the transport device comprising:
   a plurality of parallel conveyor belts, which extend in the transport direction, each of the conveyor belts being driven independently; and
   a guide strip, which extends transversely to the transport direction and which extends over a part of the conveyor belts and which is arranged behind the layer conveyor in the transport direction.

10. A bottle handling plant in accordance with claim 9, wherein the bottle handling plant has a layer-forming device for forming a bottle layer from a plurality of layer rows of bottles.

11. A bottle handling plant in accordance with claim 10, wherein the layer-forming device has a bottle conveyor, a row guide and a row pusher, wherein the bottle conveyor is configured for forming and positioning a discrete layer row and the row pusher pushes off the layer row transversely to its extension and pushes it to a last layer row of a bottle layer.

12. A bottle handling plant in accordance with claim 9 wherein the storage station is configured to store a plurality of empty bottle trays and/or bottle trays that are loaded with a bottle layer and can be stacked into a tray stack, wherein the storage station has one or more tray storage units with a loading area for loading and/or unloading the bottle tray.

13. A bottle handling plant in accordance with claim 12, wherein the tray storage unit has at least one storage area for receiving a tray stack of a plurality of bottle trays, and a storage conveyor for tray stacks, which storage conveyor connects the respective tray stacks to the loading area and to the lifting device.

14. A bottle handling plant in accordance with claim 13, wherein the storage conveyor has a lifting unit.

15. A bottle handling plant in accordance with claim 12, wherein the storage station has a plurality of separately arranged tray storage units which are connected to one another by one or more tray conveyors.

16. A bottle handling plant in accordance with claim 12, wherein the storage station comprises a stack storage unit for the tray stack with one or more automated stack conveyors configured as track bound shuttles or as floor-mounted transport vehicles.

17. A bottle handling plant in accordance with claim 16, wherein the automated stack transporters are configured as a swarm of autonomic and self-steering, floor-mounted transport vehicles.

18. A bottle handling plant in accordance with claim 16, wherein the floor-mounted transport vehicles have a lifting device for picking up and releasing a tray stack.

19. A bottle handling plant in accordance with claim 16, wherein the stack storage unit has a plurality of bottom-side storage places for tray stacks wherein support frames for deposited tray stacks are arranged at the storage places.

20. A row-forming device, wherein the row-forming device is configured to pick up a respective frontmost layer row of the bottle layer being moved in a conveying direction in rows in a transport direction transversely to the conveying direction and to remove the respective frontmost layer row of the bottle layer, wherein the row-forming device comprises:
one or more layer conveyors adjoining the transport device for conveying the bottle layer, the layer conveyor being configured to move the bottle layer in the conveying direction; and
a transport device for the formed bottle row, the transport device comprising:
   a plurality of parallel conveyor belts, which extend in the transport direction, each of the conveyor belts being driven independently; and
   a guide strip, which extends transversely to the transport direction and
which extends over a part of the conveyor belts and which is arranged behind
the layer conveyor in the transport direction,
wherein the layer conveyor has a variably controllable conveying speed and the variably controllable conveying speed is controlled such that after the frontmost bottle row of the bottle layer has been removed by the transport device, the next following bottle row is briefly accelerated and moved on rapidly, as well as positioned at a limit of the transport device, and the conveying speed is then reduced again for removing the positioned, next following bottle row. duced again for removing the positioned, next following bottle row.

* * * * *